(12) United States Patent
Kim et al.

(10) Patent No.: US 9,220,949 B2
(45) Date of Patent: Dec. 29, 2015

(54) GOLF BALL COMPOSITIONS

(71) Applicant: Taylor Made Golf Company, Inc., Carlsbad, CA (US)

(72) Inventors: Hyun J. Kim, Carlsbad, CA (US); Hong G. Jeon, Carlsbad, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 265 days.

(21) Appl. No.: 13/802,038

(22) Filed: Mar. 13, 2013

(65) Prior Publication Data

US 2014/0187354 A1    Jul. 3, 2014

Related U.S. Application Data

(60) Provisional application No. 61/746,540, filed on Dec. 27, 2012.

(51) Int. Cl.
| | |
|---|---|
| *A63B 37/04* | (2006.01) |
| *A63B 37/06* | (2006.01) |
| *A63B 37/00* | (2006.01) |
| *C08G 69/48* | (2006.01) |

(52) U.S. Cl.
CPC .............. *A63B 37/007* (2013.01); *C08G 69/48* (2013.01)

(58) Field of Classification Search
USPC ................................................. 473/351–378
See application file for complete search history.

(56) References Cited

U.S. PATENT DOCUMENTS

| | | | | |
|---|---|---|---|---|
| 4,174,358 | A  * | 11/1979 | Epstein ......................... | 525/183 |
| 4,530,975 | A  * | 7/1985  | Mukoyama et al. .......... | 525/423 |
| 4,707,528 | A  * | 11/1987 | Koizumi et al. .............. | 525/432 |
| 5,585,152 | A  * | 12/1996 | Tamura et al. ............... | 428/35.1 |
| 5,981,654 | A  * | 11/1999 | Rajagopalan .................. | 525/66 |
| 6,001,930 | A  * | 12/1999 | Rajagopalan ............... | 525/92 B |
| 6,187,864 | B1 * | 2/2001  | Rajagopalan ................. | 525/183 |
| 6,800,690 | B2 * | 10/2004 | Rajagopalan et al. ........ | 525/183 |
| 6,939,251 | B2 * | 9/2005  | Ichikawa et al. ............. | 473/378 |
| 7,157,527 | B2 * | 1/2007  | Kuntimaddi et al. ......... | 525/454 |
| 7,265,195 | B2 * | 9/2007  | Kuntimaddi et al. .......... | 528/61 |
| 7,276,570 | B2 * | 10/2007 | Kuntimaddi et al. .......... | 528/61 |
| 7,528,196 | B2 * | 5/2009  | Kim et al. ..................... | 525/184 |
| 7,939,602 | B2 * | 5/2011  | Morken et al. ................ | 525/186 |
| 8,096,899 | B2 * | 1/2012  | Kim et al. ..................... | 473/377 |
| 8,273,845 | B2 * | 9/2012  | Meltzer et al. ............... | 528/74.5 |
| 8,663,031 | B2 * | 3/2014  | Okabe et al. .................. | 473/371 |
| 8,905,862 | B2 * | 12/2014 | Bulpett et al. ................ | 473/374 |

* cited by examiner

*Primary Examiner* — Alvin Hunter
(74) *Attorney, Agent, or Firm* — Klarquist Sparkman, LLP

(57) ABSTRACT

The present invention also relates to a crosslinked polyamide composition which is the reaction product of about 70 to about 99.5 wt % (based on the combined weight of Components A and B) of one or more polyamides and about 0.5 to about 30 wt % (based on the combined weight of Components A and B) of one or more crosslinking agents; and where the crosslinked polyamide composition has a flexural modulus of about 5 to about 500 kpsi, and a material Shore D hardness of about 25 to about 85. The present invention also relates to a golf ball having a core including a center, an outer cover layer, and one or more intermediate layers, where at least one or more of the core, outer cover layer or one or more intermediate layers includes the crosslinked polyamide composition.

10 Claims, 3 Drawing Sheets

GOLF BALL COMPOSITIONS

CROSS REFERENCE TO RELATED APPLICATION

This application claims the benefit of U.S. Provisional Application No. 61/746,540, filed Dec. 27, 2012, which is incorporated herein by reference in its entirety.

BACKGROUND

The application of synthetic polymer chemistry to the field of sports equipment has revolutionized the performance of athletes in many sports. One sport in which this is particularly true is golf, especially as relates to advances in golf ball performance and ease of manufacture. For instance, the earliest golf balls consisted of a leather cover filled with wet feathers. These "feathery" golf balls were subsequently replaced with a single piece golf ball made from "gutta percha," a naturally occurring rubber-like material. In the early 1900's, the wound rubber ball was introduced, consisting of a solid rubber core around which rubber thread was tightly wound with a gutta percha cover.

More modern golf balls can be classified as one-piece, two-piece, three-piece or multi-layered golf balls. One-piece balls are molded from a homogeneous mass of material with a dimple pattern molded thereon. One-piece balls are inexpensive and very durable, but typically do not provide great distance because of relatively high spin and low velocity. Two-piece balls are made by molding a cover around a solid rubber core. These are the most popular types of balls in use today. In attempts to further modify the ball performance, especially in terms of the distance such balls travel, and the spin and the feel transmitted to the golfer through the club on striking the ball, the basic two piece ball construction has been further modified by the introduction of additional layers between the core and outer cover layer. If one additional layer is introduced between the core and outer cover layer a so called "three-piece ball" results, if two additional layers are introduced between the core and outer cover layer, a so called "four-piece ball" results, and so on.

Golf ball covers were previously made from balata rubber which was favored by some players because the softness of the cover allowed them to achieve spin rates sufficient to allow more precise control of ball direction and distance, particularly on shorter approach shots. However balata-covered balls, although exhibiting high spin and soft feel, were often deficient in terms of the durability of the cover which had a propensity to shear.

Accordingly, a variety of golf ball constructions have been developed in an attempt to provide spin rates and a feel approaching those of balata covered balls, while also providing a golf ball with a higher durability and overall distance. This has resulted in the emergence of balls, which have a solid rubber core, an outer cover layer, and one or more so called intermediate layers, as well as the application of new materials to each of these components.

A material which has been often utilized in more modern golf balls includes the various ionomer resins developed in the mid-1960's, by E.I. DuPont de Nemours and Co., and sold under the trademark SURLYN®. These ionomer resins have, to a large extent, replaced balata as a golf ball cover stock material. More recent developments in the field have attempted to utilize the various types of ionomers, both singly and in blend compositions to optimize the often conflicting golf ball performance requirements of high C.O.R. and ball velocity, and cover durability, with the need for a ball to spin and have a so-called soft feel on shorter iron shots. However, the incorporation of more acid in the ionomer and/or increasing its degree of neutralization results in a material with increased polarity, and hence one which is often less compatible with other potential blend materials. Also increasing the acid content of the ionomer while increasing C.O.R. may render the ball too hard and brittle causing a loss of shot feel, control (i.e., the ability to spin the ball) and may render the cover too brittle and prone to premature failure. Finally, the incorporation of more acid in the ionomer and/or increasing its degree of neutralization typically results in an increase in melt viscosity which in turn greatly decreases the processability of these resins. Attempts to mediate these effects by adding softer terpolymeric ionomers to high acid ionomer compositions to adjust the hardness and improve the shot "feel" often result in concomitant loss of C.O.R. and hence distance.

In an attempt to improve on ionomer cover layers, nowadays most premium golf balls utilize polyurethanes or polyureas as materials to form the outer cover layer. Thermoplastic and thermoset polyurethanes both have been used in golf ball layers, and each provides for certain advantages. Polyurethane typically is formed as the reaction product of a diol or polyol, along with an isocyanate. The reaction also can incorporate a chain extender configured to harden the polyurethane formed by the reaction. Thermoplastic polyurethanes have generally linear molecular structures and incorporate crosslinking that can be reversibly broken at elevated temperatures. As a result, thermoplastic polyurethanes can be made to flow readily, as is required for injection molding processes. Because of their excellent flowability, thermoplastic polyurethanes can be positioned readily around a golf ball core using injection molding. Unfortunately, golf ball covers comprising thermoplastic polyurethane exhibit poor shear-cut resistance. Thus, while thermoplastic polyurethane covers are less expensive to make due to their superior processability and ability to be recycled they are not favored due to the resulting inferior ball performance.

In contrast, thermoset polyurethanes have generally networked structure that incorporate irreversible chemical crosslinking and exhibit high shear-cut resistance and is much more scuff- and cut-resistant than thermoplastic polyurethane. However, the irreversible crosslinks in the thermoset polyurethane structure make it unsuitable for use in injection molding processes conventionally used for thermoplastic materials as it does not flow freely, even when heated and waste material cannot be recycled back into the golf ball manufacturing process. Though they are more expensive to process than thermoplastic polyurethanes, thermoset polyurethanes have been used in golf ball layers. For instance, U.S. Pat. No. 6,132,324 to Hubert discloses a golf ball having a cover formed from thermoset polyurethane. The patent teaches a method for casting a thermoset polyurethane cover over an ionomer inner layer, including a step of measuring the viscosity "over time, so that the subsequent steps of filling each mold half, introducing the core into one half and closing the mold can be properly timed for accomplishing centering of the core cover halves fusion and overall uniformity." The additional steps involved in casting a layer over those needed for injection molding the layer lead to added complexity and expense. Another patent discussing use of thermoset polyurethane is U.S. Pat. No. 6,435,987 to Dewanjee. This patent teaches thermosetting polyurethane comprising a toluene diisocyanate-based prepolymer, a second diisocyanate prepolymer, and a curing agent. Again, this method makes use of casting because the materials used would not be well suited to injection molding.

Another family polymeric material that has been the subject of attempts to adapt for use in golf ball layers are the polyamides such as nylon. These materials offer a number of potential advantages in golf ball layer formation given their well-known strength properties. Unfortunately many polyamides, including nylon, have proved to be too brittle for use in a golf ball cover. When efforts have been made in other fields to blend nylon with softer materials some degree of incompatibility often has resulted, rendering the blends susceptible to cracking and premature failure.

U.S. Pat. No. 4,690,981, the contents of which are incorporated herein by reference, shows soft terpolymer ionomers of ethylene/unsaturated carboxylic acid/softening comonomer which are useful in injection-molded items such as ski boots, ice skate shells, as coatings for fabrics, and as a replacement for balata in golf balls. The unsaturated carboxylic acid may be, for example, acrylic acid and methacrylic acid. The softening comonomer is, for example, an alkyl acrylate such as n-butyl acrylate. The 981 patent briefly mentions that the ionomers can be blended with other materials such as nylon, polypropylene, propylene-ethylene copolymers, linear polyethylene, and ethylene/unsaturated carboxylic acid copolymers. However, there is no indication that blends can be used for golf balls.

We have now surprisingly found that when such polyamide compositions are subjected to crosslinking via a variety of mechanisms the resulting polymers are extremely well suited to golf ball layer formation.

One such mechanism of crosslinking the polyamide compositions used in the present invention is disclosed in U.S. Pat. No. 4,671,355 which discloses a crosslinked nylon block copolymer, chemically, through the use of polyfunctional amine compounds. That is, the crosslinked nylon block copolymers are prepared by a reaction scheme in which polyfunctional amines act as crosslinking agents.

In Plast. Massy, 1993, No. 2, pp 35-37, which contains a paper entitled "Production and Properties of Crosslinked Compositions of Aliphatic Nylons" a study was conducted on the process of radiation crosslinking of an aliphatic polyamides The materials studied were nylon-6, nylon-6,6 and nylon-12. The polyfunctional monomers employed to accelerate crosslinking were triallyl cyanurate and triallyl isocyanurate.

Similarly, in the Chinese Journal of Polymer Science, Vol. 7, No. 1, there is a paper entitled "Characterization of Irradiated Crystalline Polymer-Isothermal Crystallization Kinetics of Radiation Induced Crosslinked Polyamide 1010".

Finally, U.S. Pat. No. 6,099,416A discloses a non-ionomeric golf ball cover which has been treated with crosslink-inducing irradiation at levels of at least 2 megarads up to 15 megarads. The non-ionomeric resin cover is made from material selected from the group consisting of non-ionomeric acid copolymers and terpolymers, polyamides, styrene block copolymers, polyamide block copolymers and syndiotactic resins.

In view of known strength and durability properties of polyamides, it would be desirable to somehow utilize them in the construction of a golf ball. Specifically, it would be desirable to identify particular types of polyamide materials that might be uniquely adapted to serve as materials for golf ball construction. It would also be advantageous if the polyamide compositions could be injection molded given the processing advantages of such a method for golf ball layer formation.

We have now found that polyamide compositions suitable for golf ball layers and exhibiting improved durability may be prepared by mixing a polyamide with a crosslinking agent, which crosslinking agent includes peroxide based systems, or compounds having isocyanate functionality either as a simple diisocyanate (in blocked or unblocked form) or as a polyurethane or polyurea (also each in blocked or unblocked form) Other crosslinking agents include amine, and blocked amine, amide and blocked amide as well as crosslinking agents having polyol or glycidyl functionality.

We have also found that by selection of the correct crosslinking agent in combination with molding compositions, the golf ball layers may be formed by initially injection molding the polyamide/crosslinking agent followed by subsequent initiation of the crosslinking reaction by increasing the temperature over and above that used in the initial injection molding operation.

SUMMARY

Disclosed herein is a golf ball having a core including a center, an outer cover layer and one or more intermediate layers, where at least one or more of the core, outer cover layer or one or more intermediate layers includes a crosslinked polyamide composition which is the reaction product of about 70 to about 99.5 wt % of one or more polyamides; and about 0.5 to about 30 wt % of one or more crosslinking agents, and where the crosslinked polyamide composition has a flexural modulus of about 5 to about 500 kpsi, and a material Shore D hardness of about 25 to about 85.

Also disclosed herein is a crosslinked polyamide composition which is the reaction product of about 70 to about 99.5 wt % of one or more polyamides and about 0.5 to about 30 wt % of one or more crosslinking agents, and where the crosslinked polyamide composition has a flexural modulus of about 5 to about 500 kpsi, and a material Shore D hardness of about 25 to about 85.

DETAILED DESCRIPTION OF INVENTION

Figure 1:
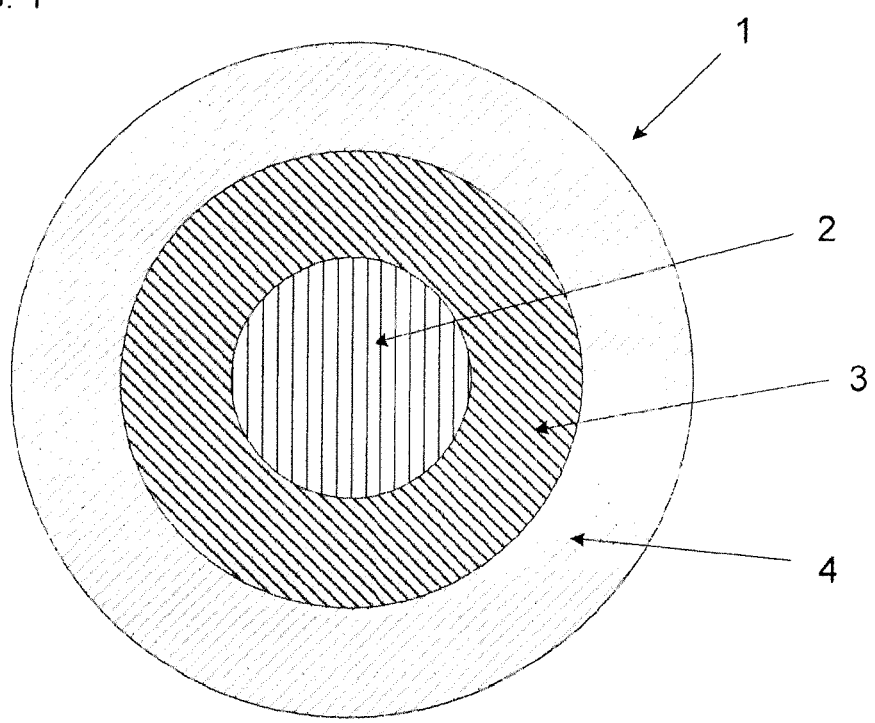
FIG. 1 illustrates a three-piece golf ball 1 comprising a solid center or core 2, a mantle layer 3, and an outer cover layer 4.
Figure 2:
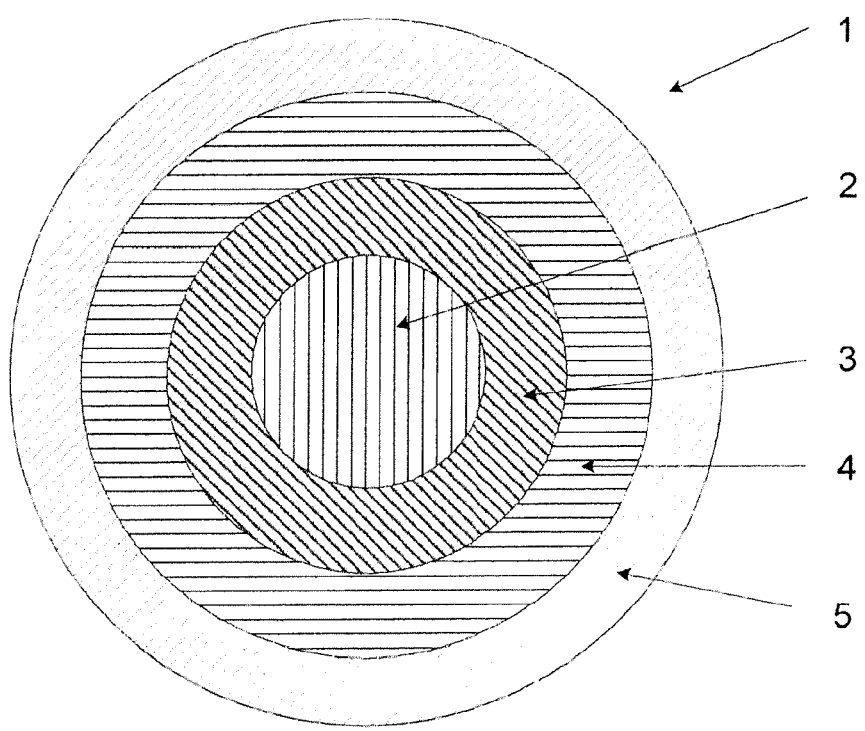
FIG. 2 illustrates a four-piece golf ball 1 comprising a core 2, and an outer cover layer 5, an inner mantle layer 3, and an outer mantle layer 4.
Figure 3:
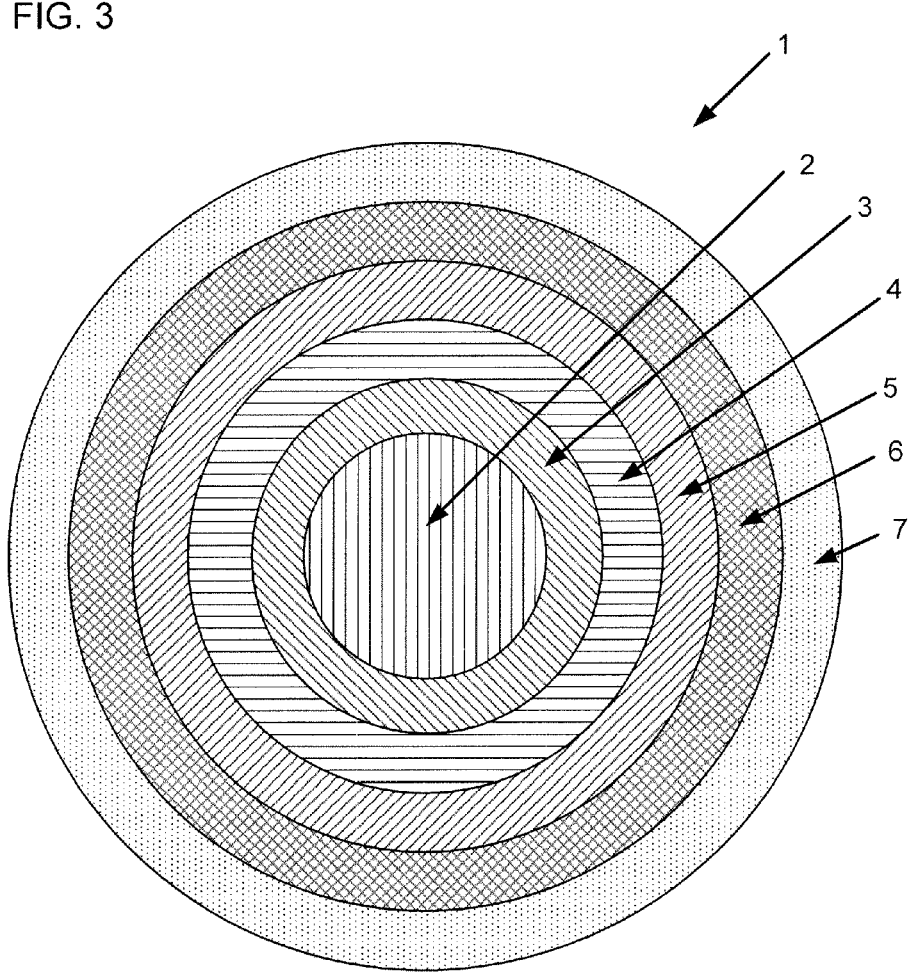
FIG. 3 illustrates a six-piece golf ball 1 comprising a core 2, and an outer cover layer 7, an inner mantle layer 3, an outer mantle layer 4, an intermediate mantle layer 5 and an inner cover layer 6.

Any numerical values recited herein include all values from the lower value to the upper value in increments of one unit provided that there is a separation of at least 2 units between any lower value and any higher value. As an example, if it is stated that the amount of a component or a value of a process variable is from 1 to 90, preferably from 20 to 80, more preferably from 30 to 70, it is intended that values such as 15 to 85, 22 to 68, 43 to 51, 30 to 32 etc. are expressly enumerated in this specification. For values, which have less than one unit difference, one unit is considered to be 0.1, 0.01, 0.001, or 0.0001 as appropriate. Thus all possible combinations of numerical values between the lowest value and the highest value enumerated herein are said to be expressly stated in this application.

The term "bimodal polymer" refers to a polymer comprising two main fractions and more specifically to the form of the polymers molecular weight distribution curve, i.e., the appearance of the graph of the polymer weight fraction as function of its molecular weight. When the molecular weight distribution curves from these fractions are superimposed into the molecular weight distribution curve for the total resulting polymer product, that curve will show two maxima or at least be distinctly broadened in comparison with the curves for the individual fractions. Such a polymer product is called bimodal. It is to be noted here that also the chemical compositions of the two fractions may be different.

As used herein, the term "block copolymer" is intended to mean a polymer comprising two or more homopolymer subunits linked by covalent bonds. The union of the homopolymer subunits may require an intermediate non-repeating subunit, known as a junction block. Block copolymers with two or three distinct blocks are called diblock copolymers and triblock copolymers, respectively.

The term "core" is intended to mean the elastic center of a golf ball. The core may be a unitary core having a center it may have one or more "core layers" of elastic material, which are usually made of rubbery material such as diene rubbers. The core may also be of a so called "dual core" construction when it is made of up of (i) an interior spherical center component formed from a thermoset material, preferably polybutadiene and (ii) a second region formed around the interior spherical center component, also formed from a thermoset material, and preferably butadiene. Although the two core regions which constitute the dual core may both be formed from polybutadiene, each region preferably has different physical properties such as resilience, hardness or modulus resulting from the use of different crosslinking packages and/or processing conditions.

The term "outer cover layer" is intended to mean the outermost layer of the golf ball; this is the layer that is directly in contact with paint and/or ink on the surface of the golf ball. If the cover consists of two or more layers, only the outermost layer is designated the outer cover layer, and the next layer inward to the direction of the core is known as the inner cover layer.

The term "fiber" as used herein is a general term for which the definition given in *Engineered Materials Handbook*, Vol. 2, "Engineering Plastics", published by A.S.M. International, Metals Park, Ohio, USA, is relied upon to refer to filamentary materials with a finite length that is at least 100 times its diameter, which is typically 0.10 to 0.13 mm (0.004 to 0.005 in.). Fibers can be continuous or specific short lengths (discontinuous), normally no less than 3.2 mm (⅛ in.). Although fibers according to this definition are preferred, fiber segments, i.e., parts of fibers having lengths less than the aforementioned are also considered to be encompassed by the invention. Thus, the terms "fibers" and "fiber segments" are used herein. In the claims appearing at the end of this disclosure in particular, the expression "fibers or fiber segments" and "fiber elements" are used to encompass both fibers and fiber segments.

The term "hydrocarbyl" is intended to mean any aliphatic, cycloaliphatic, aromatic, aryl substituted aliphatic, aryl substituted cycloaliphatic, aliphatic substituted aromatic, or cycloaliphatic substituted aromatic groups. The aliphatic or cycloaliphatic groups are preferably saturated. Likewise, the term "hydrocarbyloxy" means a hydrocarbyl group having an oxygen linkage between it and the carbon atom to which it is attached.

The term "mantle layer" is intended to mean any layer(s) in a golf ball disposed between the core (and any core layers) and the innermost cover layer. Should a ball have three mantle layers, these may be distinguished as "inner mantle layer" which refers to the mantle layer nearest the core and furthest from the outer cover layer, as opposed to the "outer mantle layer" which refers to the mantle layer furthest from the core and closest to the outer cover layer, and as opposed to the "intermediate mantle layer" which refers to the mantle layer between the inner mantle layer and the outer mantle layer. "Mantle layer" is used interchangeably with "intermediate layer."

The term "(meth)acrylic acid copolymers" is intended to mean copolymers of methacrylic acid and/or acrylic acid.

The term "(meth)acrylate" is intended to mean an ester of methacrylic acid and/or acrylic acid.

The term "partially neutralized" is intended to mean an ionomer with a degree of neutralization of less than 100 percent. The term "highly neutralized" is intended to mean an ionomer with a degree of neutralization of greater than 50 percent. The term "fully neutralized" is intended to mean an ionomer with a degree of neutralization of 100 percent.

The term "prepolymer" as used herein is intended to mean any polymeric material that can be further processed to form a final polymer material of a manufactured golf ball, such as, by way of example and not limitation, a polymerized or partially polymerized material that can undergo additional processing, such as crosslinking.

The term "sports equipment" refers to any item of sports equipment such as sports clothing, boots, sneakers, clogs, sandals, slip on sandals and shoes, golf shoes, tennis shoes, running shoes, athletic shoes, hiking shoes, skis, ski masks, ski boots, cycling shoes, soccer boots, golf clubs, golf bags, and the like.

The term "thermoplastic" as used herein is intended to mean a material that is capable of softening or melting when heated and of hardening again when cooled. Thermoplastic polymer chains often are not cross-linked or are lightly crosslinked using a chain extender, but the term "thermoplastic" as used herein may refer to materials that initially act as thermoplastics, such as during an initial extrusion process or injection molding process, but which also may be crosslinkable, such as during a compression molding step to form a final structure.

The term "thermoset" as used herein is intended to mean a material that crosslinks or cures via interaction with a crosslinking or curing agent. Crosslinking may be induced by energy, such as heat (generally above 200° C.), through a chemical reaction (by reaction with a curing agent), or by irradiation. The resulting composition remains rigid when set, and does not soften with heating. Thermosets have this property because the long-chain polymer molecules cross-link with each other to give a rigid structure. A thermoset material cannot be melted and re-molded after it is cured. Thus thermosets do not lend themselves to recycling unlike thermoplastics, which can be melted and re-molded.

The term "thermoplastic polyurethane" as used herein is intended to mean a material prepared by reaction of a prepared by reaction of a diisocyanate with a polyol, and optionally addition of a chain extender.

The term "thermoplastic polyurea" as used herein is intended to mean a material prepared by reaction of a prepared by reaction of a diisocyanate with a polyamine, with optionally addition of a chain extender.

The term "thermoset polyurethane" as used herein is intended to mean a material prepared by reaction of a diisocyanate with a polyol (or a prepolymer of the two), and a curing agent.

The term "thermoset polyurea" as used herein is intended to mean a material prepared by reaction of a diisocyanate with a polyamine (or a prepolymer of the two) and a curing agent.

The term "unimodal polymer" refers to a polymer comprising one main fraction and more specifically to the form of the polymers molecular weight distribution curve, i.e., the molecular weight distribution curve for the total polymer product shows only a single maximum.

The term "urethane prepolymer" as used herein is intended to mean the reaction product of diisocyanate and a polyol.

The term "urea prepolymer" as used herein is intended to mean the reaction product of a diisocyanate and a polyamine.

The term "zwitterion" as used herein is intended to mean a form of the compound having both an amine group and carboxylic acid group, where both are charged and where the net charge on the compound is neutral.

The present invention can be used in forming golf balls of any desired size. "The Rules of Golf" by the USGA dictate that the size of a competition golf ball must be at least 1.680 inches in diameter; however, golf balls of any size can be used for leisure golf play. The preferred diameter of the golf balls is from about 1.680 inches to about 1.800 inches. The more preferred diameter is from about 1.680 inches to about 1.760 inches. A diameter of from about 1.680 inches to about 1.740 inches is most preferred; however diameters anywhere in the range of from 1.70 to about 2.0 inches can be used. Oversize golf balls with diameters above about 1.760 inches to as big as 2.75 inches are also within the scope of the invention.

The term "polyamide" as used herein includes both homopolyamides and copolyamides. Illustrative polyamides include those obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, decamethylenediamine, 1,4-cyclohexyldiamine or m-xylylenediamine; (2) a ring-opening polymerization of cyclic lactam, such as $\epsilon$-caprolactam or $\omega$-laurolactam; (3) polycondensation of an aminocarboxylic acid, such as 6-aminocaproic acid, 9-aminononanoic acid, 11-aminoundecanoic acid or 12-aminododecanoic acid; (4) copolymerization of a cyclic lactam with a dicarboxylic acid and a diamine; or any combination of (1)-(4). In certain examples, the dicarboxylic acid may be an aromatic dicarboxylic acid or a cycloaliphatic dicarboxylic acid. In certain examples, the diamine may be an aromatic diamine or a cycloaliphatic diamine. Specific examples of suitable polyamides include polyamide 6; polyamide 11; polyamide 12; polyamide 4,6; polyamide 6,6; polyamide 6,9; polyamide 6,10; polyamide 6,12; polyamide MXD6; PA12, CX; PA12, IT; PPA; PA6, IT; and PA6/PPE.

One example of a group of suitable polyamides are thermoplastic polyamide elastomers. Thermoplastic polyamide elastomers typically are copolymers of a polyamide and polyester or polyether. For example, the thermoplastic polyamide elastomer can contain a polyamide (Nylon 6, Nylon 66, Nylon 11, Nylon 12 and the like) as a hard segment and a polyether or polyester as a soft segment. In one specific example, the thermoplastic polyamides are amorphous copolyamides based on polyamide (PA 12).

One class of copolyamide elastomers are polyether amide elastomers. Illustrative examples of polyether amide elastomers are those that result from the copolycondensation of polyamide blocks having reactive chain ends with polyether blocks having reactive chain ends, including:

(1) polyamide blocks of diamine chain ends with polyoxyalkylene sequences of dicarboxylic chains;

(2) polyamide blocks of dicarboxylic chain ends with polyoxyalkylene sequences of diamine chain ends obtained by cyanoethylation and hydrogenation of polyoxyalkylene alpha-omega dihydroxylated aliphatic sequences known as polyether diols; and (3) polyamide blocks of dicarboxylic chain ends with polyether diols, the products obtained, in this particular case, being polyetheresteramides.

More specifically, the polyamide elastomer can be prepared by polycondensation of the components (i) a diamine and a dicarboxylate, lactames or an amino dicarboxylic acid (PA component), (ii) a polyoxyalkylene glycol such as polyoxyethylene glycol, polyoxy propylene glycol (PG component) and (iii) a dicarboxylic acid.

The polyamide blocks of dicarboxylic chain ends come, for example, from the condensation of alpha-omega aminocarboxylic acids of lactam or of carboxylic diacids and diamines in the presence of a carboxylic diacid which limits the chain length. The molecular weight of the polyamide sequences is preferably between about 300 and 15,000, and more preferably between about 600 and 5,000. The molecular weight of the polyether sequences is preferably between about 100 and 6,000, and more preferably between about 200 and 3,000.

The amide block polyethers may also comprise randomly distributed units. These polymers may be prepared by the simultaneous reaction of polyether and precursor of polyamide blocks. For example, the polyether diol may react with a lactam (or alpha-omega amino acid) and a diacid which limits the chain in the presence of water. A polymer is obtained that has primarily polyether blocks and/or polyamide blocks of very variable length, but also the various reactive groups that have reacted in a random manner and which are distributed statistically along the polymer chain.

Suitable amide block polyethers include those as disclosed in U.S. Pat. Nos. 4,331,786; 4,115,475; 4,195,015; 4,839,441; 4,864,014; 4,230,848 and 4,332,920, the contents of each of which are herein incorporated by reference.

The polyether may be, for example, a polyethylene glycol (PEG), a polypropylene glycol (PPG), or a polytetramethylene glycol (PTMG), also designated as polytetrahydrofurane (PTHF). The polyether blocks may be along the polymer chain in the form of diols or diamines. However, for reasons of simplification, they are designated PEG blocks, or PPG blocks, or also PTMG blocks.

The polyether block comprises different units such as units which derive from ethylene glycol, propylene glycol, or tetramethylene glycol.

The amide block polyether comprises at least one type of polyamide block and one type of polyether block. Mixing of two or more polymers with polyamide blocks and polyether blocks may also be used. The amide block polyether also can comprise any amide structure made from the method described on the above.

Preferably, the amide block polyether is such that it represents the major component in weight, i.e., that the amount of polyamide which is under the block configuration and that which is eventually distributed statistically in the chain represents 50 weight percent or more of the amide block polyether. Advantageously, the amount of polyamide and the amount of polyether is in a ratio (polyamide/polyether) of 1/1 to 3/1.

One type of polyetherester elastomer is the family of Pebax, which are available from Elf-Atochem Company. Preferably, the choice can be made from among Pebax 2533, 3533, 4033, 1205, 7033 and 7233. Blends or combinations of Pebax 2533, 3533, 4033, 1205, 7033 and 7233 can also be prepared, as well. Pebax 2533 has a hardness of about 25 shore D (according to ASTM D-2240), a Flexural Modulus of 2.1 kpsi (according to ASTM D-790), and a Bayshore resilience of about 62% (according to ASTM D-2632). Pebax 3533 has a hardness of about 35 shore D (according to ASTM D-2240), a Flexural Modulus of 2.8 kpsi (according to ASTM D-790), and a Bayshore resilience of about 59% (according to ASTM D-2632). Pebax 7033 has a hardness of about 69 shore D (according to ASTM D-2240) and a Flexural Modulus of 67 kpsi (according to ASTM D-790). Pebax 7333 has a hardness of about 72 shore D (according to ASTM D-2240) and a flexural modulus of 107 kpsi (according to ASTM D-790).

Some examples of suitable polyamides for use in the compositions of the present invention include those commercially available under the tradenames CRISTAMID and RILSAN marketed by Atofina Chemicals of Philadelphia, Pa., GRIVORY and GRILAMID® marketed by EMS Chemie of Sumter, S.C., TROGAMID® and VESTAMID® available from Degussa, and ZYTEL marketed by E.I. DuPont de Nemours & Co., of Wilmington, Del.

Preferred polyamides comprise aromatic, aliphatic and cycloaliphatic blocks with aliphatic and cycloaliphatic blocks being more preferred. An especially preferred thermoplastic polyamide is based on polyamide 12 including polyamides made by substantially equimolar mixing of (bis(methyl-para-aminocyclohexyl)methane) (BMACM) and of dodecanedioic acid. The polymer obtained, Polyamide BMACM.12, is transparent, exhibits good mechanical properties and exhibits stress crack resistance in the presence of alcohols. Its glass transition temperature, measured by DSC, is 155° C., and it absorbs 3.0% by weight of water at 23° C.

We have now found that polyamide compositions suitable for golf ball layers and exhibiting improved durability may be prepared by mixing a polyamide with a crosslinking agent, which crosslinking agent includes peroxide based systems, or compounds having isocyanate functionality either as a simple diisocyanate (in blocked or unblocked form) or as a polyurethane or polyurea (also each in blocked or unblocked form). Other crosslinking agents include amine, and blocked amine, amide and blocked amide as well as crosslinking agents having polyol or glycidyl functionality as described in more detail below.

As discussed above, the compositions may incorporate at least one peroxide as a crosslinking agent. The peroxide used often is chosen by its reactivity, which typically is indicated by its one-hour half-life temperature (half-life temperature). Another indication of peroxide reactivity is its activation temperature, which differs from and is lower than its half-life temperature. Because the decomposition of peroxide is slow at its activation temperature, compositions elevated to the activation temperature would take many hours, or even days, to sufficiently crosslink to form the thermoset compositions. For this reason, it generally is the half-life temperature that is taken into consideration when determining the timing and temperature of the processing of the composition. The peroxide used should be selected to prevent a significant amount of premature crosslinking during, for example, injection molding or blending of the composition. Often, during processing of the composition, the temperature of the composition is raised to increase its fluidity. The processing temperature of the composition generally will be raised above the activation temperature of the peroxide, and it also may be raised above the half-life temperature of the peroxide in the composition. However, the composition is processed quickly at these temperatures and is cooled (either actively or passively) before substantial crosslinking can occur. Once the composition is positioned around a core to form a layer, additional thermal energy then can be added to the layer to raise the temperature well above the half-life temperature and induce further crosslinking to form a crosslinked polyamide. Preferably, the half-life temperature of the peroxide is above 50° C., more preferably above 60° C., still more preferably above 70° C., and most preferably above 80° C.

Examples of suitable peroxides include aliphatic peroxides, aromatic peroxides, cyclic peroxides, or mixtures of these. Primary, secondary, or tertiary peroxides can be used, with tertiary peroxides most preferred. Also, peroxides containing more than one peroxy group can be used, such as 2,5-bis-(ter.butylperoxy)-2,5-dimethyl hexane and 1,4-bis-(ter.butylperoxyisopropyl)-benzene. Also, peroxides that are either symmetrical or asymmetric can be used, such as tert.butylperbenzoate and tert.butylcumylperoxide. Additionally, peroxides having carboxy groups also can be used. Decomposition of peroxides can be brought about by applying thermal energy, shear, reactions with other chemical ingredients, or a combination of these. Homolytically decomposed peroxide, heterolytically decomposed peroxide, or a mixture of those can be used to promote crosslinking reactions in the compositions. Examples of suitable aliphatic peroxides and aromatic peroxides, include diacetylperoxide, di-tert-butylperoxide, dibenzoylperoxide, dicumylperoxide, 2,5-bis-(t-butylperoxy)-2,5-dimethyl hexane, 2,5-dimethyl-2,5-di(benzoylperoxy)hexane, 2,5-dimethyl-2,5-di(butylperoxy)-3-hexyne, n-butyl-4,4-bis(t-butylperoxyl) valerate, 1,4-bis-(t-butylperoxyisopropyl)-benzene, t-butyl peroxybenzoate, 1,1-bis-(t-butylperoxy)-3,3,5 tri-methylcyclohexane, and di(2,4-dichlorobenzoyl). Peroxides for use within the scope of this invention may be acquired from Akzo Nobel Polymer Chemicals of Chicago, Ill., Atofina of Philadelphia, Pa. and Akrochem of Akron, Ohio.

The polyamide and peroxide cross-linking agent may also be blended with a co-cross-linking agent, which may be a metal salt of an unsaturated carboxylic acid. Examples of these include zinc and magnesium salts of unsaturated fatty acids having 3 to 8 carbon atoms, such as acrylic acid, methacrylic acid, maleic acid, and fumaric acid, palmitic acid with the zinc salts of acrylic and methacrylic acid being most preferred. The unsaturated carboxylic acid metal salt can be blended in a rubber either as a preformed metal salt, or by introducing an $\alpha,\beta$-unsaturated carboxylic acid and a metal oxide or hydroxide into the rubber composition, and allowing them to react in the rubber composition to form a metal salt. The unsaturated carboxylic acid metal salt can be blended in any desired amount, but preferably in amounts of about 10 parts to about 60 parts by weight of the unsaturated carboxylic acid per 100 parts by weight of the polyamide.

Isocyanate Crosslinking Agents

Suitable isocyanate-containing components include diisocyanates having the generic structure: OCN—R—NCO, where R preferably is a cyclic, aromatic, or linear or branched hydrocarbon moiety containing from about 1 to about 50 5 carbon atoms. The isocyanate also may contain one or more cyclic groups or one or more phenyl groups. When multiple cyclic or aromatic groups are present, linear and/or branched hydrocarbons containing from about 1 to about 10 carbon atoms can be present as spacers between the cyclic or aromatic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof. Isocyanates include, but are not limited to, aliphatic, cycloaliphatic, aromatic aliphatic, aromatic, any derivatives thereof, and combinations of these compounds having two or more isocyanate (NCO) groups per molecule each a polyisocyanate (with a diisocyanate being a specific polyisocyanate with two isocyanate groups). As used herein, aromatic aliphatic compounds should be understood as those containing an aromatic ring, wherein the isocyanate group is not directly bonded to the ring. One example of an aromatic aliphatic compound is a tetramethylene diisocyanate (TMXDI). The isocyanates may be organic polyisocyanate-terminated prepolymers, free isocyanate prepolymer, and mixtures thereof. The isocyanate-containing reactable component also may include any isocyanate-functional monomer, dimer, trimer, or polymeric adduct thereof, prepolymer, quasi-prepolymer, or mixtures thereof. Isocyanate-functional compounds may include monoisocyanates or polyisocyanates that include any isocyanate functionality of two or more. Examples of polyisocyanates that can be used with the present invention include, but are not limited to, substituted and isomeric mixtures including 2,2-, 2,4-, and 4,4-diphenylmethane diisocyanate (MDI); 3,3-dimethyl-4,4-biphenylene diisocyanate (TODI); toluene diisocyanate (TDI); polymeric MDI; carbodiimide-modified liquid 4,4-diphenylmethane diisocyanate; para-phenylene diisocyanate (PPDI); meta-phenylene diisocyanate (MPDI); triphenyl methane-4,4- and triphenyl methane-4,4-triisocyanate; naphthylene-1,5-diisocyanate; 2,4-, 4,4-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; trimethylene diisocyanate; butylenes diisocyanate; bitolylene diisocyanate; toluidine diisocyanate; tetramethylene-1,2-diisocyanate; tetramethylene-1,3-diisocyanate; tetramethylene-1,4-diisocyanate; pentamethylene diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; diethylidene diisocyanate; methylcyclohexylene diisocyanate (HTDI); 2,4-methylcyclohexane diisocyanate; 2,6-methylcyclohexane diisocyanate; 4,4-dicyclohexyl diisocyanate; 2,4_-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4-bis(isocyanatomethyl)dicyclohexane; 2,4-bis(isocyanatomethyl)dicyclohexane; isophorone diisocyanate (IPDI); dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis(isocyanato-methyl)cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanato-methyl-3,5,5-trimethylcyclo-hexyl isocyanate, 1-isocyanato-3,3,5-trimethyl-5-isocyanatomethylcyclohexane, cyclohexyl isocyanate, dicyclohexylmethane 4,4'-diisocyanate, 1,4-bis(isocyanatomethyl)cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, triphenylmethane 4,4', 4"-triisocyanate, isocyanatoethyl methacrylate, 3-isopropenyl-1,1-dimethylbenzylisocyanate, dichlorohexamethylene diisocyanate, 1,1'-diisocyanato-1,4-diethylbenzene, polymethylene polyphenylene polyisocyanate, isocyanurate modified compounds, and carbodiimide modified compounds, as well as biuret modified compounds of the above polyisocyanates.

These isocyanates may be used either alone or in combination. These combination isocyanates include triisocyanates, such as biuret of hexamethylene diisocyanate and triphenylmethane triisocyanates, and polyisocyanates, such as polymeric diphenylmethane diisocyanate.triisocyanate of HDI; triisocyanate of 2,2,4-trimethyl-1,6-hexane diisocyanate (TMDI); 4,4-dicyclohexylmethane diisocyanate (H12MDI); 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof, dimerized uretdione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

Blocked Isocyanate Crosslinking Agents

Also included as crosslinking agents for the crosslinked polyamide compositions are the so-called blocked isocyanates, in which the isocyanate groups are preferably blocked as a result of the reaction of a suitable isocyanate with a blocking agent. The blocking agent may be any suitable blocking agent that results in the prevention of premature polymerization or crosslinking of the isocyanate groups.

Suitable blocking agents include, but are not limited to, linear and branched alcohols; phenols and derivatives thereof, such as xylenol; oximes, such as methyl ethyl ketoxime; lactams, such as ε-caprolactam; lactones, such as caprolactone; dicarbonyl compounds; hydroxamic acid esters; bisulfite addition compounds; hydroxylamines; esters of phydroxybenzoic acid; N-hydroxyphthalimide; N-hydroxysuccinimide; triazoles; substituted imidazolines; tetrahydropyrimidines; caprolactones; and mixtures thereof. In one embodiment, the blocking agent is selected from the group consisting of phenols, branched alcohols, methyl ethyl ketoxime, ε-caprolactam, ε-caprolactone, and mixtures thereof.

In this aspect of the invention, preferably greater than about 80 percent of the socyanate radicals are blocked, and more preferably about 90 percent or greater of the isocyanate radicals are blocked. In one embodiment, about 95 percent or more of the isocyanate radicals are blocked.

In another embodiment, about 97 percent or more of the isocyanate radicals are blocked. In still another embodiment, substantially all of the isocyanate radicals are blocked.

The blocked isocyanate compound is stable at room temperature as for example a carbamic acid compound free of isocyanate radicals capable of liberating at room temperature. When heated, or reacted with a "deblocking" agent, the isocyanate radicals are activated, i.e., deblocked and dissociated. For example, in one embodiment, the isocyanate group(s) is blocked with ε-caprolactone. The ε-caprolactone volatilizes at a temperature of approximately 300° F., exposing the polyisocyanate groups for crosslinking. Also included are the blocked isocyanates disclosed in Kim et al. in U.S. Pat. No. 6,939,924, the entire contents of which are hereby incorporated by reference, The blocked isocyanates suitable for use as the crosslinking agent in the present invention include isophorone diisocyanate (IPDI)-based uretdione-type crosslinkers; a combination of a uretdione adduct of IPDI and a partially ε-caprolactam-modified IPDI; a combination of isocyanate adducts modified by ε-caprolactam and a carboxylic acid functional group; a caprolactam-modified Desmodur diisocyanate; a Desmodur diisocyanate having a 3,5-dimethyl pyrazole modified isocyanate; and any and all mixtures of these.

Polyurea or Polyurethane Prepolymer Crosslinking Agents

Another crosslinking agent is the so-called polyurea or polyurethane prepolymers typically used in combination with polyol or polyamine chain extenders to prepare hermoplastic or thermoset polyureas and polyurethanes respectively. The polyurea or polyurethane prepolymers are formed from the reaction of a polyisocyanate with either one or more polyols, to form a polyurethane prepolymer, or from the reaction of a diisocyanate with one or more a polyamines to form a polyurea prepolymer. Although depicted as discrete component packages as above, it is readily appreciated by those skilled in the art that it is possible to control the residual diisocyanate content in the prepolymer by controlling the stoichiometry of the initial diisocyanate-to-polyol or polyamine ratio. The higher this ratio the more residual or "free" isocyanate groups in the polymer which can then be used in crosslinking reaction used to form the crosslinked polyamide compositions used in the golf balls of the present invention.

The diisocyanates suitable to form the polyurethane or polyurea prepolymers include all those earlier described for use as the diisocyante crosslinking agent. Polyols suitable for use to form the polyurethane prepolymers include, but are not limited to, polyester polyols, polyether polyols, polycarbonate polyols and polydiene polyols such as polybutadiene polyols. Generally, polyurethane prepolymer mixtures may be formed from polycaprolactone-based polyols, polyether-based polyols, or polyester-based polyols. In various embodiments, the polyol may comprise one or more of a polyether, a polyester, or a polycaprolactone, preferably having a molecular weight (MW) ranging from 200 to 6000, e.g., from 400 to 3000 or from 1000 to 2500. In this context, molecular weight refers to the number average molecular weight in Daltons. Such polyols may include, for example, polyester of adipic acid, polyether of ethylene oxide, polyether of propylene oxide, polyether of tetrahydrofuran, polycaprolactone (PCL), polycarbonate, and mixtures thereof. In various optional embodiments, the polyol comprises glycols or triols having molecular weights ranging, for example, from about 60 to about 400, e.g., from about 80 to about 300 or from about 100 to about 200. Such glycols or triols may include, for example, ethylene glycol, isomers of propylene glycol, isomers of butane diol, hexanediol, trimethylolpropane, pentaerythritol, poly(tetramethylene ether)glycol, diethylene glycol, triethylene glycol, dipropylene glycol, tripropylene glycol, and mixtures thereof.

Representative polyols include primary, secondary, or tertiary polyols. Non-limiting examples of these polyols include: trimethylolpropane (TMP), ethylene glycol, 1,3-propanediol, 1,4-butanediol, 1,5-pentanediol, 1,6-hexanediol, propylene glycol, dipropylene glycol, 1,2-butanediol, 1,3-butanediol, 2,3-butanediol, 1,2-pentanediol, 2,3-pentanediol, 2,5-hexanediol, 2,4-hexanediol, 2-ethyl-1,3-hexanediol, 5 cyclohexanediol, 2-ethyl-2-(hydroxymethyl)-1,3-propanediol, polypropylene glycol (PPG) such as Acclaim 4220 (Bayer MaterialScience), PPG diol polymer from propylene oxide such as Acclaim 3201 (Bayer Material Science), PPG-EO diol (copolymer from propylene oxide and ethylene oxide) such as Arcol R-2744 (Bayer Material Science), PPG diol (PPG 2000), poly(ethylene adipate)glycol (PEAG) such as PEAG 1000 (Chemtura Corporation), poly(trimethylolpropane ethylene adipate)glycol (PTEAG), poly(tetramethylene ether)glycol (PTMEG of PTMG), such as Terathane™ 1000 (Invista), tripropylene glycol (Aldrich Chemical Company, Inc.), and diethylene glycol (Aldrich Chemical).

Polyamines suitable for use to form the polyurea prepolymers include primary, secondary and tertiary amines having two or more amines as functional groups. Polyamines suitable for use to from the polyurea prepolymers include, but are not limited to, amineterminated hydrocarbons, amine-terminated polyethers, amine-terminated polyesters, amineterminated polycaprolactones, amine-terminated polycarbonates, amine-terminated polyamides, and mixtures thereof. The amine-terminated compound may be a polyether amine selected from polytetramethylene ether diamines, polyoxypropylene diamines, poly(ethylene oxide capped oxypropylene) ether diamines, triethyleneglycoldiamines, propylene oxide-based triamines, trimethylolpropane-based triamines, glycerin-based triamines, and mixtures thereof. Exemplary diamines include aliphatic diamines, such as tetramethylenediamine, pentamethylenediamine, hexamethylenediamine; alicyclic diamines, such as 3,3'-dimethyl-4,4'-diamino-dicyclohexyl methane; or aromatic diamines, such as diethyl-2,4-toluenediamine, 4,4"-methylenebis-(3-chloro,2,6-diethyl)-aniline (available from Air Products and Chemicals Inc., of Allentown, Pa., under the trade name LONZACURE®), 3,3'-dichlorobenzidene; 3,3'-dichloro-4,4'-diaminodiphenyl methane (MOCA); N,N,N',N'-tetrakis(2-hydroxypropyl)ethylenediamine, 3,5-dimethylthio-2,4-toluenediamine; 3,5-dimethylthio-2,6-toluenediamine; N,N'-ialkyldiamino diphenyl methane; trimethylene-glycol-di-paminobenzoate; polytetramethyleneoxide-di-p-aminobenzoate, 4,4'-methylenebis-2-chloroaniline, 2,2',3,3'-tetrachloro-4,4'-diaminophenyl methane, p,p'-methylenedianiline, p-phenylenediamine or 4,4'-diaminodiphenyl; and 2,4,6-tris(dimethylaminomethyl) phenol.

Depending on their chemical structure, the polyurea or polyurethane prepolymers may be formed by combination of a polyisocyanate with slow- or fast-reacting polyamines or polyols. As described in U.S. Pat. Nos. 6,793,864, 6,719,646 and copending 5 U.S. Patent Publication No. 2004/0201133 A1, (the contents of all of which are hereby incorporated herein by reference), slow-reacting polyamines are diamines having amine groups that are sterically and/or electronically hindered by electron withdrawing groups or bulky groups situated proximate to the amine reaction sites. The spacing of the amine reaction sites will also affect the reactivity speed of the polyamines. These include, but are not limited to, 3,5-dimethylthio-2,4-toluenediamine; 3,5-dimethylthio-2,6-toluenediamine; N,N'-dialkyldiamino diphenyl methane; trimethylene-glycol-di-p-aminobenzoate; polytetramethyleneoxide-di-paminobenzoate, and mixtures thereof. Of these, 3,5-dimethylthio-2,4-toluenediamine and 3,5-dimethylthio-2,6-toluenediamine are isomers and are sold under the trade name ETHACURE® 300 by Ethyl Corporation. Trimethylene glycol-di-p-aminobenzoate is sold under the trade name POLACURE 740M and polytetramethyleneoxide-di-p-aminobenzoates are sold under the trade name POLAMINES by Polaroid Corporation. N,N'-dialkyldiamino diphenyl methane is sold under the trade name UNILINK® by UOP.

One preferred prepolymer is a toluene diisocyanate prepolymer with polypropylene glycol. Such polypropylene glycol terminated toluene diisocyanate prepolymers are available from Uniroyal Chemical Company of Middlebury, Conn., under the trade name ADIPRENE® LFG963A and LFG640D. Most preferred prepolymers are the polytetramethylene ether glycol terminated toluene diisocyanate prepolymers including those available from Uniroyal Chemical Company of Middlebury, Conn., under the trade name ADIPRENE® LF930A, LF950A, LF601D, and LF751D.

Blocked Polyurea or Polyurethane Prepolymer Crosslinking Agents

Further illustrative crosslinking agents are polyurea or polyurethane prepolymers in which the residual isocyanate groups are initially blocked and then subsequently liberated to participate in the subsequent crosslinking reaction with the polyamide composition. The reaction of the isocyanate and blocking agent may be accomplished in any suitable way that results in a blocked prepolymer. For example, a diisocyanate having isocyanate radicals with different reactivities, such as 2,4-toluene diisocyanate, may be used to form a half blocked intermediate. The half-blocked intermediate is then reacted with an amine-terminated component to form a polyurea prepolymer or a polyol to form a polyurethane 5 prepolymer. The blocking agent used to form the half-blocked intermediate may be any suitable blocking agent. One specific example includes the use of equal parts of 2-ethylhexanol and 2,4-toluene diisocyanate.

In addition, commercially available urethane and urea elastomers with blocked isocyanate groups are contemplated for use as the first polymeric system. For example, ADIPRENE® BL-16, commercially available from Crompton Corporation of Middlebury, Conn., is a liquid urethane elastomer with blocked isocyanate curing sites that can be activated by heating. The blocking agent is methyl ethyl ketoxime. The free isocyanate content is less than 0.25 percent by weight.

Polyamine Crosslinking Agents

Another family of crosslinking agents used to form the crosslinked polyamides includes the various polyamines. These include primary, secondary and tertiary amines having two or more amines as functional groups. Exemplary diamines include aliphatic diamines, such as tetramethylenediamine, pentamethylenediamine, hexamethylenediamine; alicyclic diamines, such as 3,3'-dimethyl-4,4'-diamino-dicyclohexyl methane; or aromatic diamines, such as diethyl-2,4-toluenediamine, 4,4"-methylenebis-(3-chloro,2,6-diethyl)-aniline (available from Air Products and Chemicals Inc., of Allentown, Pa., under the trade name LONZACURE®), 3,3'-dichlorobenzidene; 3,3'-dichloro-4,4'-diaminodiphenyl methane (MOCA); N,N,N',N'-tetrakis(2-hydroxypropyl)ethylenediamine, 3,5-dimethylthio-2,4-toluenediamine; 3,5-dimethylthio-2,6-toluenediamine; N,N'-dialkyldiamino diphenyl methane; trimethylene-glycol-di-p-aminobenzoate; polytetramethyleneoxide-di-p-aminobenzoate, 4,4'-methylene bis-2-chloroaniline, 2,2',3,3'-tetrachloro-4,4'-diaminophenyl methane,p,p'-methylenedianiline, p-phenylenediamine or 4,4'-diaminodiphenyl; and 2,4,6-tris (dimethylaminomethyl) phenol. Other suitable amine crosslinking agents for use in the present invention include, but are not limited to, 3,5-dimethylthio-2,4-toluenediamine; 3,5-dimethylthio-2,6-toluenediamine; N,N'-dialkyldiamino diphenyl methane; trimethylene-glycoldi-p-aminobenzoate; polytetramethyleneoxide-di-p-aminobenzoate, and mixtures thereof. Of these, 3,5-dimethylthio-2,4-toluenediamine and 3,5-dimethylthio-2,6-toluenediamine are 20 isomers and are sold under the trade name ETHACURE® 300 by Ethyl Corporation. Trimethylene glycol-di-p-aminobenzoate is sold under the trade name POLACURE 740M and polytetramethyleneoxide-di-p-aminobenzoates are sold under the trade name POLAMINES by Polaroid Corporation. N,N'-dialkyldiamino diphenyl methane is sold under the trade name UNILINK® by UOP.

Polyamines suitable for use as crosslinking agents in the compositions include, but are not limited to, amine terminated compounds typically are selected from amine-terminated hydrocarbons, amine terminated polyethers, amine-terminated polyesters, amine-terminated polycaprolactones, amine-terminated polycarbonates, amine-terminated polyamides, and mixtures thereof. The amine-terminated compound may be a polyether amine selected from polytetramethylene ether diamines, polyoxypropylene diamines, poly (ethylene oxide capped oxypropylene) ether diamines, triethyleneglycoldiamines, propylene oxide-based triamines, trimethylolpropane-based triamines, glycerin-based triamines, and mixtures thereof. Diamines and other suitable polyamines may be added to the compositions to function as curing agents.

Blocked Polyamine Crosslinking Agents

Also included as the crosslinking agent are the blocked polyamines which can include those amine carbamate salts formed by reacting of the amines described heretofore as ionomer crosslinking agents with $CO_2$. Other preferred blocked amine crosslinking agents include various ketimines or aldimines which are known to the art and to the literature. Such compounds are generally prepared by reacting a polyamine with either a ketone or an aldehyde. Examples of specific ketimine compounds which can be utilized are set forth in U.S. Pat. No. 4,507,443, the entire content of which is hereby fully incorporated by reference. These blocked curatives react slowly in the absence of moisture, but unblock during application to form a polyamine and a volatile ketone.

Also included are complexes of polyamines (described heretofore as ionomer crosslinking agents) with salts. These complexes are virtually non-reactive at room temperature but when heated the salt complex unblocks and the freed polyamine then is available to crosslink the ionomer or ionomer precursor. The metal salts can be any suitable metal salt, including alkali, alkaline earth, transition metal, and main group metal salts. Particularly preferred are the alkali and alkaline metal salts. Some examples of suitable alkali metal salts include those metal salts formed by combination of any of lithium, sodium, potassium, or rubidium with any of fluoride, chloride, bromide, or iodide. A particularly preferred alkali metal salt is sodium chloride. Some examples of suitable alkaline earth metal salts include those metal salts formed by combination of any of magnesium, calcium, strontium, or barium with any of fluoride, chloride, bromide, or iodide. Salt complexes of methylenedianiline are commercially available, under the trade name CAYTUR® from Chemtura Corporation including CAYTUR 21DA and 31 DA which are complexes of methylene dianiline (MDA) and sodium chloride dispersed in dioctyl adipate, and CAYTUR 21 and 31 which are complexes of methylene dianiline (MDA) and sodium chloride dispersed in dioctyl phthalate.

Dicyandiamide Crosslinking Agents

Another family of crosslinking agents used to form the crosslinked polyamides is the family of dicyandiamides as described in U.S. Pat. No. 7,879,968, the entire contents of which are hereby incorporated by reference. Dicyandiamide may be commercially acquired from Degussa AG under the trade name DYHARD®.

Glycidyl Crosslinking Agents

Another family of crosslinking agents used to form the crosslinked polyamides used in the present invention are the family of glycidyl group-containing polymers. Examples of suitable glycidyl groups in copolymers or terpolymers in the polymeric modifier include esters and ethers of aliphatic glycidyl, such as allylglycidylether, vinylglycidylether, glycidyl maleate and itaconate glycidyl acrylate and methacrylate, and also alicyclic glycidyl esters and ethers, such as 2-cyclohexene-1-glycidylether, cyclohexene-4,5 diglycidylcarboxylate, cyclohexene-4-glycidyl carboxylate, 5-norbornene-2-methyl-2-glycidyl carboxylate, and endocis-icyclo(2,2,1)-5-heptene-2,3-diglycidyl dicarboxylate. These polymers having a glycidyl group may comprise other monomers, such as esters of unsaturated carboxylic acid, for example, alkyl (meth)acrylates or vinyl esters of unsaturated carboxylic acids. Polymers having a glycidyl group can be obtained by copolymerization or graft polymerization with homopolymers or copolymers.

Examples of suitable terpolymers having a glycidyl group include LOTADER® AX8900 and AX8920, marketed by Atofina Chemicals, ELVALOY® marketed by E.I. Du Pont de Nemours & Co., and REXPEARL marketed by Nippon Petrochemicals Co., Ltd. Additional examples of copolymers comprising epoxy monomers and which are suitable for use within the scope of the present invention include styrene-butadiene-styrene block copolymers in which the polybutadiene block contains epoxy group, and styrene-isoprene-styrene block copolymers in which the polyisoprene block contains epoxy. Commercially available examples of these epoxy 10 functional copolymers include ESBS A1005, ESBS A1010, ESBS A1020, ESBS AT018, and ESBS AT019, marketed by Daicel Chemical Industries, Ltd.

The crosslinked polyamide compositions may be used directly to prepare the cover and/or intermediate layers of the golf balls or may be used in blends with other materials, which other materials may also be used as a separate component of the core, cover layer or intermediate layer of the golf balls of the present invention. These other materials include, without limitation, synthetic and natural rubbers, thermoset polymers such as thermoset polyurethanes or thermoset polyureas, as well as thermoplastic polymers including thermoplastic elastomers such as metallocene catalyzed polymer, unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, thermoplastic polyurethanes, thermoplastic polyureas, polyamides, copolyamides, polyesters, copolyesters, polycarbonates, polyolefins, halogenated (e.g. chlorinated) polyolefins, halogenated polyalkylene compounds, such as halogenated polyethylene [e.g. chlorinated polyethylene (CPE)], polyalkenamer, polyphenylene oxides, polyphenylene sulfides, diallyl phthalate polymers, polyimides, polyvinyl chlorides, polyamide-ionomers, polyurethane-ionomers, polyvinyl alcohols, polyarylates, polyacrylates, polyphenylene ethers, impact-modified polyphenylene ethers, polystyrenes, high impact polystyrenes, acrylonitrile-butadiene-styrene copolymers, styrene-acrylonitriles (SAN), acrylonitrile-styrene-acrylonitriles, styrene-maleic anhydride (S/MA) polymers, styrenic block copolymers including styrene-butadiene-styrene (SBS), styrene-ethylene-butylene-styrene, (SEBS) and styrene-ethylene-propylene-styrene (SEPS), styrenic terpolymers, functionalized styrenic block copolymers including hydroxylated, functionalized styrenic copolymers, and terpolymers, cellulosic polymers, liquid crystal polymers (LCP), ethylene-propylene-diene terpolymers (EPDM), ethylene-vinyl acetate copolymers (EVA), ethylene-propylene copolymers, propylene elastomers (such as those described in U.S. Pat. No. 6,525,157, to Kim et al, the entire contents of which is hereby incorporated by reference), ethylene vinyl acetates, polyureas, and polysiloxanes and any and all combinations thereof.

One preferred material which may be used to form the cover layers and/or mantle layers of the golf balls is a block copolymer including di and triblock copolymers incorporating a first polymer block having an aromatic vinyl compound, and a second polymer block having an olefinic and/or conjugated diene compound. Preferred aromatic vinyl compounds include styrene, α-methylstyrene, o-, m- or p-methylstyrene, 4-propylstyrene, 1,3-dimethylstyrene, vinylnaphthalene and vinylanthracene. In particular, styrene and α-methylstyrene are preferred. These aromatic vinyl compounds can each be used alone, or can be used in combination of two or more kinds. The aromatic vinyl compound is preferably contained in the block copolymer in an amount of from 5 to 75% by weight, and more preferably from 10 to 65% by weight.

The conjugated diene compound, that constitutes another polymer block in the block copolymer can include for example, 1,3-butadiene, isoprene, 2,3-diemthyl-1,3-butadiene, 1,3-pentadiene and 1,3-hexadiene. In particular, isoprene and 1,3-butadiene are preferred. These conjugated diene compounds can each be used alone, or can be used in combination of two or more kinds.

Preferred block copolymers include the styrenic block copolymers such as styrene-butadiene-styrene (SBS), styrene-ethylene-butylene-styrene, (SEBS) and styrene-ethylene-propylene-styrene (SEPS). Commercial examples include SEPTON® marketed by Kuraray Company of Kurashiki, Japan; TOPRENE® by Kumho Petrochemical Co., Ltd and KRATON® marketed by Kraton Polymers. Also included are functionalized styrenic block copolymers, including those where the block copolymer incorporates a first polymer block having an aromatic vinyl compound, a second polymer block having a conjugated diene compound and a hydroxyl group located at a block copolymer, or its hydrogenation product. One such functionalized styrenic block copolymer is SEPTON® HG-252.

Another preferred material which may be used to form the cover layers and/or mantle layers of the golf balls is an acidic polymer that incorporates at least one type of an acidic functional group. Examples of such acidic polymers suitable for use as include, but are not limited to, ethylene/(meth)acrylic acid copolymers and ethylene/(meth)acrylic acid/alkyl (meth)acrylate terpolymers, or ethylene and/or propylene maleic anhydride copolymers and terpolymers. Examples of such polymers which are commercially available include, but are not limited to, the ESCOR® 5000, 5001, 5020, 5050, 5070, 5100, 5110 and 5200 series of ethylene-acrylic acid copolymers sold by Exxon Mobil, the PRIMACOR® 1321, 1410, 1410-XT, 1420, 1430, 2912, 3150, 3330, 3340, 3440, 3460, 4311, 4608 and 5980 series of ethylene-acrylic acid copolymers sold by The Dow Chemical Company, Midland, Mich. and the ethylene-methacrylic acid copolymers such as NUCREL® 599, 699, 0903, 0910, 925, 960, 2806, and 2906 sold by DuPont.

Also included are the so called bimodal ethylene/carboxylic acid polymers as described in U.S. Pat. No. 6,562,906, the contents of which are incorporated herein by reference. These polymers comprise a first component comprising an ethylene/α,β-ethylenically unsaturated $C_{3-8}$ carboxylic acid high copolymer, particularly ethylene (meth)acrylic acid copolymers and ethylene, alkyl (meth)acrylate, (meth)acrylic acid terpolymers, having a weight average molecular weight, Mw, of about 80,000 to about 500,000, and a second component comprising an ethylene/α,β-ethylenically unsaturated $C_{3-8}$ carboxylic acid copolymers, particularly ethylene/(meth) acrylic acid copolymers having weight average molecular weight, Mw, of about 2,000 to about 30,000.

Another preferred material which may be used to form the cover layers and/or mantle layers of the golf balls is an ionomer resin. One family of such resins was developed in the mid-1960's, by E.I. DuPont de Nemours and Co., and is sold under the trademark SURLYN®. Preparation of such ionomers is well known, for example see U.S. Pat. No. 3,264,272. Generally speaking, most commercial ionomers are unimodal and consist of a polymer of a mono-olefin, e.g., an alkene, with an unsaturated mono- or dicarboxylic acids having 3 to 12 carbon atoms. An additional monomer in the form of a mono- or dicarboxylic acid ester may also be incorporated in the formulation as a so-called "softening comonomer". The incorporated carboxylic acid groups are then neutralized by a basic metal ion salt, to form the ionomer. The metal cations of the basic metal ion salt used for neutralization include $Li^+$, $Na^+$, $K^+$, $Zn^{2+}$, $Ca^{2+}$, $Co^{2+}$, $Ni^{2+}$, $Cu^{2+}$, $Pb^{2+}$, and $Mg^{2+}$, with the $Li^+$, $Na^+$, $Ca^{2+}$, $Zn^{2+}$, and $Mg^{2+}$ being preferred. The basic metal ion salts include those of for example formic acid, acetic acid, nitric acid, and carbonic acid, hydrogen carbonate salts, oxides, hydroxides, and alkoxides.

The first commercially available ionomer resins contained up to 16 weight percent acrylic or methacrylic acid, although it was also well known at that time that, as a general rule, the hardness of these cover materials could be increased with increasing acid content. Hence, in Research Disclosure 29703, published in January 1989, DuPont disclosed ionomers based on ethylene/acrylic acid or ethylene/methacrylic acid containing acid contents of greater than 15 weight percent. In this same disclosure, DuPont also taught that such so called "high acid ionomers" had significantly improved stiffness and hardness and thus could be advantageously used in golf ball construction, when used either singly or in a blend with other ionomers.

More recently, high acid ionomers can be ionomer resins with acrylic or methacrylic acid units present from 16 wt. % to about 35 wt. % in the polymer. Generally, such a high acid ionomer will have a flexural modulus from about 50,000 psi to about 125,000 psi.

Ionomer resins further comprising a softening co-monomer, present from about 10 wt. % to about 50 wt. % in the polymer, have a flexural modulus from about 2,000 psi to about 10,000 psi, and are sometimes referred to as "soft" or "very low modulus" ionomers. Typical softening co-monomers include n-butyl acrylate, iso-butyl acrylate, n-butyl methacrylate, methyl acrylate and methyl methacrylate.

Today, there are a wide variety of commercially available ionomer resins based both on copolymers of ethylene and (meth)acrylic acid or terpolymers of ethylene and (meth) acrylic acid and (meth)acrylate, many of which are be used as a golf ball component. The properties of these ionomer resins can vary widely due to variations in acid content, softening comonomer content, the degree of neutralization, and the type of metal ion used in the neutralization. The full range commercially available typically includes ionomers of polymers of general formula, E/X/Y polymer, wherein E is ethylene, X is a $C_3$ to $C_8$ α,β ethylenically unsaturated carboxylic acid, such as acrylic or methacrylic acid, and is present in an amount from about 2 to about 30 weight % of the E/X/Y copolymer, and Y is a softening comonomer selected from the group consisting of alkyl acrylate and alkyl methacrylate, such as methyl acrylate or methyl methacrylate, and wherein the alkyl groups have from 1-8 carbon atoms, Y is in the range of 0 to about 50 weight % of the E/X/Y copolymer, and wherein the acid groups present in said ionomeric polymer are partially neutralized with a basic metal salt with metal ions selected from the group consisting of lithium, sodium, potassium, magnesium, calcium, barium, lead, tin, zinc or aluminum, or a combination of such cations.

The ionomer may also be a so-called bimodal ionomer as described in U.S. Pat. No. 6,562,906 (the entire contents of which are herein incorporated by reference). These ionomers are bimodal as they are prepared from blends comprising polymers of different molecular weights. Specifically they include bimodal polymer blend compositions comprising:

a) a high molecular weight component having a weight average molecular weight, Mw, of about 80,000 to about 500,000 and comprising one or more ethylene/α,β-ethylenically unsaturated $C_{3-8}$ carboxylic acid copolymers and/or one or more ethylene, alkyl (meth)acrylate, (meth)acrylic acid terpolymers; said high molecular weight component being partially neutralized with a basic metal salt with metal ions selected from the group consisting of lithium, sodium, zinc, calcium, magnesium, and a mixture of any these; and b) a low molecular weight component having a weight average molecular weight, Mw, of about from about 2,000 to about 30,000 and comprising one or more ethylene/α,β-ethylenically unsaturated $C_{3-8}$ carboxylic acid copolymers and/or one or more ethylene, alkyl (meth)acrylate, (meth)acrylic acid terpolymers; said low molecular weight component being partially neutralized with a basic metal salt with metal ions selected from the group consisting of lithium, sodium, potassium, magnesium, calcium, barium, lead, tin, zinc or aluminum, and a mixture of any these.

In addition to the unimodal and bimodal ionomers, also included are the so-called "modified ionomers" examples of which are described in U.S. Pat. Nos. 6,100,321, 6,329,458 and 6,616,552 and U.S. Patent Publication US 2003/0158312 A1, the entire contents of all of which are herein incorporated by reference.

The modified unimodal ionomers may be prepared by mixing:

a) an ionomeric polymer comprising ethylene, from 5 to 25 weight percent (meth)acrylic acid, and from 0 to 40 weight percent of a (meth)acrylate monomer, said ionomeric polymer neutralized with a basic metal salt with metal ions selected from the group consisting of lithium, sodium, potassium, magnesium, calcium, barium, lead, tin, zinc or aluminum, and any and all mixtures thereof; and b) from about 5 to about 40 weight percent (based on the total weight of said modified ionomeric polymer) of one or more fatty acids or metal salts of said fatty acid, the metal salt having metal ions selected from the group consisting of lithium, sodium, potassium, magnesium, calcium, barium, lead, tin, zinc or aluminum, and any and all mixtures thereof; and the fatty acid preferably being stearic acid.

The modified bimodal ionomers, which are ionomers derived from the earlier described bimodal ethylene/carboxylic acid polymers (as described in U.S. Pat. No. 6,562,906, the entire contents of which are herein incorporated by reference), are prepared by mixing;

a) a high molecular weight component having a weight average molecular weight, Mw, of about 80,000 to about 500,000 and comprising one or more ethylene/α,β-ethylenically unsaturated $C_{3-8}$ carboxylic acid copolymers and/or one or more ethylene, alkyl (meth)acrylate, (meth)acrylic acid terpolymers; said high molecular weight component being partially neutralized with a basic metal salt with metal ions selected from the group consisting of lithium, sodium, potassium, magnesium, calcium, barium, lead, tin, zinc or aluminum, and any and all mixtures thereof; and b) a low molecular weight component having a weight average molecular weight, Mw, of about from about 2,000 to about 30,000 and comprising one or more ethylene/α,β-ethylenically unsaturated $C_{3-8}$ carboxylic acid copolymers and/or one or more ethylene, alkyl (meth)acrylate, (meth)acrylic acid terpolymers; said low molecular weight component being partially neutralized with a basic metal salt with metal ions selected from the group consisting of lithium, sodium, potassium, magnesium, calcium, barium, lead, tin, zinc or aluminum, and any and all mixtures thereof; and c) from about 5 to about 40 weight percent (based on the total weight of said modified ionomeric polymer) of one or more fatty acids or metal salts of said fatty acid, the metal salt having metal ions selected from the group consisting of lithium, sodium, potassium, magnesium, calcium, barium, lead, tin, zinc or aluminum, and any and all mixtures thereof; and the fatty acid preferably being stearic acid.

The fatty or waxy acid salts utilized in the various modified ionomers are composed of a chain of alkyl groups containing from about 4 to 75 carbon atoms (usually even numbered) and characterized by a —COOH terminal group. The fatty or waxy acids utilized to produce the fatty or waxy acid salts modifiers may be saturated or unsaturated, and they may be present in solid, semi-solid or liquid form.

Examples of suitable saturated fatty acids, i.e., fatty acids in which the carbon atoms of the alkyl chain are connected by single bonds, include but are not limited to stearic acid ($CH_3(CH_2)_{16}COOH$), palmitic acid ($CH_3(CH_2)_{14}COOH$), pelargonic acid ($CH_3(CH_2)_7COOH$) and lauric acid ($CH_3(CH_2)_{10}COOH$). Examples of suitable unsaturated fatty acids, i.e., a fatty acid in which there are one or more double bonds between the carbon atoms in the alkyl chain, include but are not limited to oleic acid ($CH_3(CH_2)_7 CH:CH(CH_2)_7COOH$).

The source of the metal ions used to produce the metal salts of the fatty or waxy acid salts used in the various modified ionomers are generally various metal salts which provide the metal ions capable of neutralizing, to various extents, the carboxylic acid groups of the fatty acids. These include the sulfate, carbonate, acetate and hydroxylate salts of zinc, barium, calcium and magnesium.

Since the fatty acid salts modifiers comprise various combinations of fatty acids neutralized with a large number of different metal ions, several different types of fatty acid salts may be utilized in the invention, including metal stearates, laureates, oleates, and palmitates, with calcium, zinc, sodium, lithium, potassium and magnesium stearate being preferred, and calcium and sodium stearate being most preferred.

The fatty or waxy acid or metal salt of said fatty or waxy acid is present in the modified ionomeric polymers in an amount of from about 5 to about 40, preferably from about 7 to about 35, more preferably from about 8 to about 20 weight percent (based on the total weight of said modified ionomeric polymer).

As a result of the addition of the one or more metal salts of a fatty or waxy acid, from about 40 to 100, preferably from about 50 to 100, more preferably from about 70 to 100 percent of the acidic groups in the final modified ionomeric polymer composition are neutralized by a metal ion.

An example of such a modified ionomer polymer is DUPONT® HPF-1000 available from E. I. DuPont de Nemours and Co. Inc.

Another preferred material which may be used to form the cover layers and/or mantle layers of the golf balls is a multi-component blend composition ("MCBC") prepared by blending together at least three materials, identified as Components A, B, and C, and melt-processing these components to form in-situ, a polymer blend composition incorporating a pseudo-crosslinked polymer network. Such blends are more fully described in U.S. Pat. No. 6,508,725 to H. J. Kim, the entire contents of which are hereby incorporated by reference.

Another preferred material which may be used to form the cover layers and/or mantle layers or core layers of the golf balls are the polyalkenamers which may be prepared by ring opening metathesis polymerization of one or more cycloalkenes in the presence of organometallic catalysts as described in U.S. Pat. Nos. 3,492,245, and 3,804,803, the entire contents of both of which are herein incorporated by reference, (the polyalkenamers although examples of a polymer produced from a cyclic olefin are distinct from the COP's used in the present invention as they are not derived from a norbornene based monomer). Examples of suitable polyalkenamer rubbers are polypentenamer rubber, polyheptenamer rubber, polyoctenamer rubber, polydecenamer rubber and polydodecenamer rubber. For further details concerning polyalkenamer rubber, see Rubber Chem. & Tech., Vol. 47, page 511-596, 1974, which is incorporated herein by reference.

The polyalkenamer rubbers have a trans-content of from about 40 to about 95, preferably of from about 45 to about 90, and most preferably from about 50 to about 85 wt %, and a cis-content of from about 5 to about 60, preferably of from about 10 to about 55, and most preferably from about 15 to about 50 wt % with a melting point of greater than about 15, preferably greater than about 20 more preferably greater than about 25° C. and exhibit excellent melt processability above their sharp melting temperatures and high miscibility with various rubber additives as a major component without deterioration of crystallinity which in turn facilitates injection molding. Thus, unlike synthetic rubbers typically used in golf ball preparation, polyalkenamer-based compounds can be prepared which are injection moldable. The polyalkenamer rubbers may also be blended with other polymers and an especially preferred blend is that of a polyalkenamer and a polyamide. A more complete description of the polyalkenamer rubbers and blends with polyamides is disclosed in U.S. Pat. No. 7,528,196 in the name of Hyun Kim et al., the entire contents of which are hereby incorporated by reference.

When used to form the mantle layers or cover layers of the golf balls the properties of the polyalkenamer such as compression, hardness and modulus may be further modified by crosslinking using the various cross linking packages well known in the golf ball art to crosslink polybutadiene for use in golf ball cores including crosslinking agents, co-crosslinking agents, peptizers and accelerators.

Suitable cross-linking agents include peroxides, sulfur compounds, or other known chemical cross-linking agents, as well as mixtures of these. Non-limiting examples of suitable cross-linking agents include primary, secondary, or tertiary aliphatic or aromatic organic peroxides. Peroxides containing more than one peroxy group can be used, such as 2,5-dimethyl-2,5-di(tert-butylperoxy)hexane and 1,4-di-(2-tert-butyl peroxyisopropyl)benzene. Both symmetrical and asymmetrical peroxides can be used, for example, tert-butyl perbenzoate and tert-butyl cumyl peroxide. Peroxides incorporating carboxyl groups also are suitable. Non-limiting examples of suitable peroxides include: diacetyl peroxide; di-tert-butyl peroxide; dibenzoyl peroxide; dicumyl peroxide; 2,5-dimethyl-2,5-di(benzoylperoxy)hexane; 1,4-bis-(t-butylperoxy-isopropyl)benzene; t-butylperoxybenzoate; 2,5-dimethyl-2,5-di-(t-butylperoxy)hexyne-3, such as Trigonox 145-45B, marketed by Akrochem Corp. of Akron, Ohio; 1,1-bis(t-butylperoxy)-3,3,5 tri-methylcyclohexane, such as Varox 231-XL, marketed by R. T. Vanderbilt Co., Inc. of Norwalk, Conn.; and di-(2,4-dichlorobenzoyl)peroxide. The cross-linking agents can be blended in total amounts of about 0.05 part to about 5 parts, more preferably about 0.2 part to about 3 parts, and most preferably about 0.2 part to about 2 parts, by weight of the cross-linking agents per 100 parts by weight of the unsaturated polymer.

Besides the use of chemical cross-linking agents, exposure of the polyalkenamer composition to radiation also can serve as a cross-linking agent. Radiation can be applied to the unsaturated polymer mixture by any known method, including using microwave or gamma radiation, or an electron beam device. Additives may also be used to improve radiation curing of the diene polymer.

The polyalkenamer rubber and cross-linking agent may be blended with a co-cross-linking agent, which may be a metal salt of an unsaturated carboxylic acid. Examples of these include zinc and magnesium salts of unsaturated fatty acids having 3 to 8 carbon atoms, such as acrylic acid, methacrylic acid, maleic acid, and fumaric acid, palmitic acid with the zinc salts of acrylic and methacrylic acid being most preferred. The unsaturated carboxylic acid metal salt can be blended in a rubber either as a preformed metal salt, or by introducing an $\alpha,\beta$-unsaturated carboxylic acid and a metal oxide or hydroxide into the polyalkenamer composition, and allowing them to react in the polyalkenamer composition to form a metal salt. The unsaturated carboxylic acid metal salt can be blended in any desired amount, but preferably in amounts of about 10 parts to about 60 parts by weight of the unsaturated carboxylic acid per 100 parts by weight of the polyalkenamer.

The polyalkenamer compositions may also incorporate one or more of the so-called "peptizers". The peptizer preferably comprises an organic sulfur compound and/or its metal or non-metal salt. Examples of such organic sulfur compounds include thiophenols, such as pentachlorothiophenol, 4-butyl-o-thiocresol, 4 t-butyl-p-thiocresol, and 2-benzamidothiophenol; thiocarboxylic acids, such as thiobenzoic acid; 4,4' dithio dimorpholine; and, sulfides, such as dixylyl disulfide, dibenzoyl disulfide; dibenzothiazyl disulfide; di(pentachlorophenyl)disulfide; dibenzamido diphenyldisulfide (DBDD), and alkylated phenol sulfides, such as VULTAC marketed by Atofina Chemicals, Inc. of Philadelphia, Pa. Preferred organic sulfur compounds include pentachlorothiophenol, and dibenzamido diphenyldisulfide.

Examples of the metal salt of an organic sulfur compound include sodium, potassium, lithium, magnesium calcium, barium, and cesium and zinc salts of the above-mentioned thiophenols and thiocarboxylic acids, with the zinc salt of pentachlorothiophenol being most preferred.

Examples of the non-metal salt of an organic sulfur compound include ammonium salts of the above-mentioned thiophenols and thiocarboxylic acids wherein the ammonium cation has the general formula $[NR^1R^2R^3R^4]^+$ where $R^1$, $R^2$, $R^3$ and $R^4$ are selected from the group consisting of hydrogen, a $C_1$-$C_{20}$ aliphatic, cycloaliphatic or aromatic moiety, and any and all combinations thereof, with the most preferred being the $NH_4^+$-salt of pentachlorothiophenol.

Additional peptizers include aromatic or conjugated peptizers comprising one or more heteroatoms, such as nitrogen, oxygen and/or sulfur. More typically, such peptizers are heteroaryl or heterocyclic compounds having at least one heteroatom, and potentially plural heteroatoms, where the plural heteroatoms may be the same or different. Such peptizers include peptizers such as an indole peptizer, a quinoline peptizer, an isoquinoline peptizer, a pyridine peptizer, purine peptizer, a pyrimidine peptizer, a diazine peptizer, a pyrazine peptizer, a triazine peptizer, a carbazole peptizer, or combinations of such peptizers.

Suitable peptizers also may include one or more additional functional groups, such as halogens, particularly chlorine; a sulfur-containing moiety exemplified by thiols, where the functional group is sulfhydryl (—SH), thioethers, where the functional group is —SR, disulfides, ($R_1S$—$SR_2$), etc.; and combinations of functional groups. Such peptizers are more fully disclosed in U.S. Pat. No. 8,030,411 in the name of Hyun Kim et al, the entire contents of which are herein incorporated by reference. A most preferred example is 2,3,5,6-tetrachloro-4-pyridinethiol (TCPT).

The peptizer, if employed in the polyalkenamer composition, is present in an amount up to about 10, from about 0.01 to about 10, preferably of from about 0.10 to about 7, more preferably of from about 0.15 to about 5 parts by weight per 100 parts by weight of the synthetic rubber component.

The polyalkenamer compositions used to form the golf balls may also include the various fillers as previously described herein. Especially preferred fillers include the one or more so called nanofillers, as described in U.S. Pat. No. 6,794,447 and copending U.S. Publication No. US2004-0092336 filed on Sep. 24, 2003 and U.S. Pat. No. 7,332,533 filed on Aug. 25, 2004, the entire contents of each of which are incorporated herein by reference.

Polyoctenamer rubbers are commercially available from Huls AG of Marl, Germany, and through its distributor in the U.S., Creanova Inc. of Somerset, N.J., and sold under the trademark VESTENAMER®. Two grades of the VESTENAMER® trans-polyoctenamer are commercially available: VESTENAMER 8012 designates a material having a trans-content of approximately 80% (and a cis-content of 20%) with a melting point of approximately 54° C.; and VESTENAMER 6213 designates a material having a trans-content of approximately 60% (cis-content of 40%) with a melting point of approximately 30° C. Both of these polymers have a double bond at every eighth carbon atom in the ring.

Another preferred material which may be used to form the cover layers and/or mantle layers is the family of polyurethanes or polyureas which are typically prepared by reacting a diisocyanate with a polyol (in the case of polyurethanes) or with a polyamine (in the case of a polyurea). Thermoplastic polyurethanes or polyureas may consist solely of this initial mixture or may be further combined with a chain extender to vary properties such as hardness of the thermoplastic. Thermoset polyurethanes or polyureas typically are formed by the reaction of a diisocyanate and a polyol or polyamine respectively, and an additional crosslinking agent to crosslink or cure the material to result in a thermoset.

In what is known as a one-shot process, the three reactants, diisocyanate, polyol or polyamine, and optionally a chain extender or a curing agent, are combined in one step. Alternatively, a two-step process may occur in which the first step involves reacting the diisocyanate and the polyol (in the case of polyurethane) or the polyamine (in the case of a polyurea) to form a so-called prepolymer, to which can then be added either the chain extender or the curing agent. This procedure is known as the prepolymer process.

The various polymer compositions used to prepare the golf balls may also be further modified by addition of a monomeric aliphatic and/or aromatic amide as described in copending US Publication No. 2007-0100085 A1 filed on Nov. 1, 2006 in the name of Hyun Kim et al., the entire contents of which are hereby incorporated by reference.

Another particularly well-suited additive for use in the various polymer compositions used to prepare the golf balls includes compounds having the general formula:

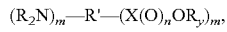

$(R_2N)_m—R'—(X(O)_nOR_y)_m$, where R is hydrogen, or a $C_1$-$C_{20}$ aliphatic, cycloaliphatic or aromatic systems; R' is a bridging group comprising one or more $C_1$-$C_{20}$ straight chain or branched aliphatic or alicyclic groups, or substituted straight chain or branched aliphatic or alicyclic groups, or aromatic group, or an oligomer of up to 12 repeating units including, but not limited to, polypeptides derived from an amino acid sequence of up to 12 amino acids; and X is C or S with the proviso that when X=C, n=1 and y=1 and when X=S, n=2 and y=1. Also, m=1-3. These materials are more fully described in U.S. Pat. No. 7,767,759 filed on Jul. 14, 2005, the entire contents of which are incorporated herein by reference.

Preferably the material is selected from the group consisting of 4,4'-methylene-bis-(cyclohexylamine)carbamate (commercially available from R.T. Vanderbilt Co., Norwalk Conn. under the tradename DIAKO® 4), 11-aminoundecanoicacid, 12-aminododecanoic acid, epsilon-caprolactam; omega-caprolactam, and any and all combinations thereof.

The golf balls also can include, in suitable amounts, one or more additional ingredients generally employed in golf ball compositions. Agents provided to achieve specific functions, such as additives and stabilizers, can be present. Exemplary suitable ingredients include antioxidants, colorants, dispersants, mold releasing agents, processing aids, plasticizers, pigments, U.V. absorbers, optical brighteners, or any other additives generally employed in plastics formulation or the preparation of golf balls and any and all combinations thereof. Although not required, UV stabilizers, or photo stabilizers such as substituted hydroxphenyl benzotriazoles may be utilized in the present invention to enhance the UV stability of the final compositions. An example of a commercially available UV stabilizer is the stabilizer sold by Ciba Geigy Corporation under the tradename TINUVIN®.

The various polymeric compositions used to prepare the golf balls also can incorporate one or more fillers. Such fillers are typically in a finely divided form, for example, in a size generally less than about 20 mesh, preferably less than about 100 mesh U.S. standard size, except for fibers and flock, which are generally elongated. Filler particle size will depend upon desired effect, cost, ease of addition, and dusting considerations. The appropriate amounts of filler required will vary depending on the application but typically can be readily determined without undue experimentation.

The filler preferably is selected from the group consisting of precipitated hydrated silica, limestone, clay, talc, asbestos, barytes, glass fibers, aramid fibers or powders, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate, metals, including tungsten, steel, copper, cobalt or iron, metal alloys, tungsten carbide, metal oxides, metal stearates, and other particulate carbonaceous materials, and any and all combinations thereof. Preferred examples of fillers include metal oxides, such as zinc oxide and magnesium oxide.

In another preferred aspect the filler comprises an aramid polymer (in the form of a powder or fiber) in order to increase the flexural modulus or hardness and to improve the impact endurance of the matle and cover layers of the golf balls. The term "aramid" as used in the present specification means a synthetic polymeric resin generally designated in the art as an aromatic polycarbonamide. The polycarbonamides may be synthesized from the monomers 1,4-phenylene-diamine (para-phenylenediamine) and terephthaloyl chloride in a condensation reaction yielding hydrochloric acid as a byproduct. Aramid is more fully disclosed in Technical Disclosure T950, 008 (95 OG 6, published Sep. 7, 1976, and based on an application originally filed Feb. 18, 1975) and U.S. Pat. Nos. 3,652,510; 3,699,085; and 3,673,143, as well as the divisional patent thereof, U.S. Pat. No. 3,817,941, the disclosures of each of which are incorporated herein by reference.

Suitable aramid polymers are commercially available under tradenames including KEVLAR® (E.I. du Pont de Nemours and Company), TWARON® (Akzo Nobel), Technora (Teijin), NOMEX® and Nomex Z200 (E.I. du Pont de Nemours and Company), Teijinconex (Teijin), and Apial (Unitika). Materials especially suitable for use as the hardness-enhancing materials which are appropriate for the mantle or cover layers of the golf ball according to the invention include aramid fibers, such as Kevlar, including types PRD 29 and PRD 49.

In another preferred aspect the filler comprises one or more so called nanofillers, as described in U.S. Pat. No. 6,794,447 and copending U.S. Publication No. US2004-0092336 filed on Sep. 24, 2003 and U.S. Pat. No. 7,332,533 filed on Aug. 25, 2004, the entire contents of each of which are incorporated herein by reference.

A most preferred aspect would be a filler comprising a nanofiller clay material surface modified with an amino acid including 12-aminododecanoic acid. Such fillers are available from Nanonocor Co. under the tradename NANOMER® 1.24TL.

The filler can be blended in variable effective amounts, such as amounts of greater than 0 to at least about 80 parts, and more typically from about 10 parts to about 80 parts, by weight per 100 parts by weight of the base rubber. If desired, the rubber composition can additionally contain effective amounts of a plasticizer, an antioxidant, and any other additives generally used to make golf balls.

The cores of the golf balls may include the traditional rubber components used in golf ball applications including, both natural and synthetic rubbers, such as cis-1,4-polybutadiene, trans-1,4-polybutadiene, 1,2-polybutadiene, cis-polyisoprene, trans-polyisoprene, polychloroprene, polybutylene, styrene-butadiene rubber, styrene-butadiene-styrene block copolymer and partially and fully hydrogenated equivalents, styrene-isoprene-styrene block copolymer and partially and fully hydrogenated equivalents, nitrile rubber, silicone rubber, and polyurethane, as well as mixtures of these. Polybutadiene rubbers, especially 1,4-polybutadiene rubbers containing at least 40 mol %, and more preferably 80 to 100 mol % of cis-1,4 bonds, are preferred because of their high rebound resilience, moldability, and high strength after vulcanization. The polybutadiene component may be synthesized by using rare earth-based catalysts, nickel-based catalysts, or cobalt-based catalysts, conventionally used in this field. Polybutadiene obtained by using lanthanum rare earth-based catalysts usually employ a combination of a lanthanum rare earth (atomic number of 57 to 71)-compound, but particularly preferred is a neodymium compound.

Also included as cores are the so-called "dual cores" which comprise (i) an interior spherical center component formed from a polybutadiene thermoset material and (ii) a second spherical component formed around the spherical center component, also formed from a thermoset material, and preferably butadiene.

The cores of the golf balls may also include 1,2-polybutadienes having differing tacticity, all of which are suitable as unsaturated polymers for use in the presently disclosed compositions, are atactic 1,2-polybutadiene, isotactic 1,2-polybutadiene, and syndiotactic 1,2-polybutadiene. Syndiotactic 1,2-polybutadiene having crystallinity suitable for use as an unsaturated polymer in the presently disclosed compositions are polymerized from a 1,2-addition of butadiene. The presently disclosed golf balls may include syndiotactic 1,2-polybutadiene having crystallinity and greater than about 70% of 1,2-bonds, more preferably greater than about 80% of 1,2-bonds, and most preferably greater than about 90% of 1,2-bonds. Also, the 1,2-polybutadiene may have a mean molecular weight between about 10,000 and about 350,000, more preferably between about 50,000 and about 300,000, more preferably between about 80,000 and about 200,000, and most preferably between about 10,000 and about 150,000. Examples of suitable syndiotactic 1,2-polybutadienes having crystallinity suitable for use in golf balls are sold under the trade names RB810, RB820, and RB830 by JSR Corporation of Tokyo, Japan.

The cores of the golf balls may also include the polyalkenamer rubbers as previously described herein and disclosed in U.S. Pat. No. 7,528,196 in the name of Hyun Kim et al., the entire contents of which are hereby incorporated by reference.

The cores of the golf balls may also include the various fillers as previously described herein. Especially preferred fillers include the one or more so called nanofillers, as described in U.S. Pat. No. 6,794,447 and copending U.S. Publication No. US2004-0092336 filed on Sep. 24, 2003 and U.S. Pat. No. 7,332,533 filed on Aug. 25, 2004, the entire contents of each of which are incorporated herein by reference.

When synthetic rubbers such as the aforementioned polybutadienes or polyalkenamers and their blends are used in the golf balls they may contain further materials typically often used in rubber formulations including crosslinking agents, co-crosslinking agents, peptizers and accelerators.

Suitable cross-linking agents for use in the golf balls include peroxides, sulfur compounds, or other known chemical cross-linking agents, as well as mixtures of these. Non-limiting examples of suitable cross-linking agents include primary, secondary, or tertiary aliphatic or aromatic organic peroxides. Peroxides containing more than one peroxy group can be used, such as 2,5-dimethyl-2,5-di(tert-butylperoxy) hexane and 1,4-di-(2-tert-butyl peroxyisopropyl)benzene. Both symmetrical and asymmetrical peroxides can be used, for example, tert-butyl perbenzoate and tert-butyl cumyl peroxide. Peroxides incorporating carboxyl groups also are suitable. The decomposition of peroxides used as cross-linking agents in the present invention can be brought about by applying thermal energy, shear, irradiation, reaction with other chemicals, or any combination of these. Both homolytically and heterolytically decomposed peroxide can be used in the present invention. Non-limiting examples of suitable peroxides include: diacetyl peroxide; di-tert-butyl peroxide; dibenzoyl peroxide; dicumyl peroxide; 2,5-dimethyl-2,5-di(benzoylperoxy)hexane; 1,4-bis-(t-butylperoxyisopropyl) benzene; t-butylperoxybenzoate; 2,5-dimethyl-2,5-di-(t-butylperoxy)hexyne-3, such as Trigonox 145-45B, marketed by Akrochem Corp. of Akron, Ohio; 1,1-bis(t-butylperoxy)-3,3,5 tri-methylcyclohexane, such as Varox 231-XL, marketed by R.T. Vanderbilt Co., Inc. of Norwalk, Conn.; and di-(2,4-dichlorobenzoyl)peroxide. The cross-linking agents can be blended in total amounts of about 0.05 part to about 5 parts, more preferably about 0.2 part to about 3 parts, and most preferably about 0.2 part to about 2 parts, by weight of the cross-linking agents per 100 parts by weight of the unsaturated polymer.

Besides the use of chemical cross-linking agents, exposure of the composition to radiation also can serve as a cross-linking agent. Radiation can be applied to the unsaturated polymer mixture by any known method, including using microwave or gamma radiation, or an electron beam device. Additives may also be used to improve radiation curing of the diene polymer.

The rubber and cross-linking agent may be blended with a co-cross-linking agent, which may be a metal salt of an unsaturated carboxylic acid. Examples of these include zinc and magnesium salts of unsaturated fatty acids having 3 to 8 carbon atoms, such as acrylic acid, methacrylic acid, maleic acid, and fumaric acid, palmitic acid with the zinc salts of acrylic and methacrylic acid being most preferred. The unsaturated carboxylic acid metal salt can be blended in a rubber either as a preformed metal salt, or by introducing an $\alpha,\beta$-unsaturated carboxylic acid and a metal oxide or hydroxide into the rubber composition, and allowing them to react in the rubber composition to form a metal salt. The unsaturated carboxylic acid metal salt can be blended in any desired amount, but preferably in amounts of about 10 parts to about 60 parts by weight of the unsaturated carboxylic acid per 100 parts by weight of the synthetic rubber.

The core compositions may also incorporate one or more of the so-called "peptizers". The peptizer preferably comprises an organic sulfur compound and/or its metal or non-metal salt. Examples of such organic sulfur compounds include thiophenols, such as pentachlorothiophenol, 4-butyl-o-thiocresol, 4 t-butyl-p-thiocresol, and 2-benzamidothiophenol; thiocarboxylic acids, such as thiobenzoic acid; 4,4' dithio dimorpholine; and, sulfides, such as dixylyl disulfide, dibenzoyl disulfide; dibenzothiazyl disulfide; di(pentachlorophenyl)disulfide; dibenzamido diphenyldisulfide (DBDD), and alkylated phenol sulfides, such as VULTAC marketed by Atofina Chemicals, Inc. of Philadelphia, Pa. Preferred organic sulfur compounds include pentachlorothiophenol, and dibenzamido diphenyldisulfide.

Examples of the metal salt of an organic sulfur compound include sodium, potassium, lithium, magnesium calcium, barium, and cesium and zinc salts of the above-mentioned thiophenols and thiocarboxylic acids, with the zinc salt of pentachlorothiophenol being most preferred.

Examples of the non-metal salt of an organic sulfur compound include ammonium salts of the above-mentioned thiophenols and thiocarboxylic acids wherein the ammonium cation has the general formula $[NR^1R^2R^3R^4]^+$ where $R^1$, $R^2$, $R^3$ and $R^4$ are selected from the group consisting of hydrogen, a $C_1$-$C_{20}$ aliphatic, cycloaliphatic or aromatic moiety, and any and all combinations thereof, with the most preferred being the $NH_4^+$-salt of pentachlorothiophenol.

Additional peptizers include aromatic or conjugated peptizers comprising one or more heteroatoms, such as nitrogen, oxygen and/or sulfur. More typically, such peptizers are heteroaryl or heterocyclic compounds having at least one heteroatom, and potentially plural heteroatoms, where the plural heteroatoms may be the same or different. Such peptizers include peptizers such as an indole peptizer, a quinoline peptizer, an isoquinoline peptizer, a pyridine peptizer, purine peptizer, a pyrimidine peptizer, a diazine peptizer, a pyrazine peptizer, a triazine peptizer, a carbazole peptizer, or combinations of such peptizers.

Suitable peptizers also may include one or more additional functional groups, such as halogens, particularly chlorine; a sulfur-containing moiety exemplified by thiols, where the functional group is sulfhydryl (—SH), thioethers, where the functional group is —SR, disulfides, ($R_1$S—$SR_2$), etc.; and combinations of functional groups. Such peptizers are more fully disclosed in U.S. Pat. No. 8,030,411 in the name of Hyun Kim et al, the entire contents of which are herein incorporated by reference. A most preferred example is 2,3,5,6-tetrachloro-4-pyridinethiol (TCPT).

The peptizer, if employed in the golf balls, is present in an amount up to about 10, from about 0.01 to about 10, preferably of from about 0.10 to about 7, more preferably of from about 0.15 to about 5 parts by weight per 100 parts by weight of the synthetic rubber component.

For example, a preferred mode of preparation for the cores is to first mix the core ingredients on a two-roll mill, to form slugs of approximately 30-40 g, and then compression-mold in a single step at a temperature between 150 to 180° C., for a time duration between 5 and 12 minutes.

The various core components may also be combined to form a golf ball by an injection molding process, which is also well known to one of ordinary skill in the art. The curing time depends on the various materials selected, and those of ordinary skill in the art will be readily able to adjust the curing time upward or downward based on the particular materials used and the discussion herein.

After core formation, the various formulations for the intermediate layer and/or outer cover layer may be produced by any generally known method. The polymer(s), crosslinking agent(s), filler(s) additives and the like can be mixed together with or without melting them. Dry blending equipment, such as a tumble mixer, V-blender, ribbon blender, or two-roll mill, can be used to mix the compositions. The golf ball compositions can also be mixed using a mill, internal mixer such as a Banbury or Farrel continuous mixer, extruder or combinations of these, with or without application of thermal energy to produce melting. The various components can be mixed together with the cross-linking agents, or each additive can be added in an appropriate sequence to the milled unsaturated polymer. In another method of manufacture the cross-linking agents and other components can be added to the unsaturated polymer as part of a concentrate using dry blending, roll milling, or melt mixing or a combination of those, to achieve a good dispersive mixing, distributive mixing, or both. Examples of melt-mixing are roll-mill; internal mixer, such as injection molding, single-screw extruder, twin-screw extruder; or any combination of those The feed to the injection mold may be blended manually or mechanically prior to the addition to the injection molder feed hopper.

After core formation, the golf ball cover and any intermediate layers are typically positioned over the core using one of three methods: casting, injection molding, or compression molding. Injection molding generally involves using a mold having one or more sets of two hemispherical mold sections that mate to form a spherical cavity during the molding process. The pairs of mold sections are configured to define a spherical cavity in their interior when mated. When used to mold an outer cover layer for a golf ball, the mold sections can be configured so that the inner surfaces that mate to form the spherical cavity include protrusions configured to form dimples on the outer surface of the molded cover layer. When used to mold a layer onto an existing structure, such as a ball core, the mold includes a number of support pins disposed throughout the mold sections. The support pins are configured to be retractable, moving into and out of the cavity perpendicular to the spherical cavity surface. The support pins maintain the position of the core while the molten material flows through the gates into the cavity between the core and the mold sections. The mold itself may be a cold mold or a heated mold.

In contrast, compression molding of a ball cover or intermediate layer typically requires the initial step of making half shells by injection molding the layer material into a cold injection mold. The half shells then are positioned in a compression mold around a ball core, whereupon heat and pressure are used to mold the half shells into a complete layer over the core, with or without a chemical reaction such as crosslinking. Compression molding also can be used as a curing step after injection molding. In such a process, an outer layer of thermally curable material is injection molded around a core in a cold mold. After the material solidifies, the ball is removed and placed into a mold, in which heat and pressure are applied to the ball to induce curing in the outer layer.

Of the various cover molding processes, injection molding is most preferred, due to the efficiencies gained by its use including a more rapid cycle time, cheaper operating costs and an improved ability to produce thinner layers around the core and closely control any thickness variation. This latter advantage is becoming more important with the developments of multi-layered balls with two or more intermediate layers between the core and cover thus requiring thinner layer formation.

In an especially preferred process, the polyamide composition containing any crosslinking package is injection molded around a core or mantled core in a cold mold under conditions of temperature and pressure which are designed to allow the material to flow into the mold but not sufficient to initiate the crosslinking reaction. After the material solidifies, the ball is removed and placed into a mold, in which heat and pressure are applied to the ball to induce curing in the layer. This process is then repeated for each additional crosslinked polyamide layer.

Alternatively, the intermediate layers and/or outer cover layer comprising the polyamide composition may also be formed around the core by first forming half shells by injection molding the polyamide and crosslinker composition under conditions of temperature and pressure which are designed to allow the material to flow into the mold but not sufficient to initiate the crosslinking reaction followed by compression molding the half shells about the core to form a mantled core or around a preformed mantled core to form the final ball.

In a most preferred method, the polyamide composition containing any crosslinking package is injection molded around a core or mantled core in a cold mold under conditions of temperature and pressure which are designed to allow the material to flow into the mold but not sufficient to initiate the crosslinking reaction. After the material solidifies, the mold is rapidly heated sufficient to induce curing in the layer. This process is then repeated for each additional crosslinked polyamide layer.

In one example of a golf ball, the core comprises polybutadiene; one or more of the intermediate layers comprise a polyalkenamer; and the outer cover layer comprises the crosslinked polyamide composition where the crosslinking agent comprises an organic peroxide or an isocyante or a blocked isocyanate, or a polyurethane prepolymer or polyurea prepolymer, or a blocked polyurethane prepolymer or a blocked polyurea prepolymer, or a polyamine or a blocked polyamine, or a dicyandiamide or a glycidyl group-containing polymer.

In another example of a golf ball, the core comprises polybutadiene; one or more of the intermediate layers comprise an ionomer or modified ionomer and the outer cover layer comprises the crosslinked polyamide composition of the present invention where the crosslinking agent comprises an comprises an organic peroxide, or an isocyante or a blocked isocyanate, or a polyurethane prepolymer or polyurea prepolymer, or a blocked polyurethane prepolymer or a blocked polyurea prepolymer or a poly amine or a blocked polyamine or a dicyandiamide or a glycidyl group-containing polymer.

In certain embodiments the polyamide used to form the crosslinked polyamide compositions is present in an amount of from about 70 to about 99.5, preferably about 75 to about 99, and more preferably from about 80 to about 98 wt % (based on the total weight of the crosslinked polyamide composition).

In certain embodiments the crosslinking agent used in the crosslinked polyamide compositions is present in an amount of from about 0.5 to about 30, preferably about 1 to about 25, and more preferably from about 2 to about 20 wt % (based on the total weight of the crosslinked polyamide composition).

In certain embodiments the crosslinked polyamide composition used to make the golf balls has a material Shore D hardness of from about 25 to about 85, preferably from about 30 to about 80, more preferably from about 35 to about 75.

In certain embodiments the crosslinked polyamide composition used to make the golf balls of the present invention has a flexural modulus from about 5 to about 500, preferably from about 15 to about 400, more preferably from about 20 to about 300, still more preferably from about 25 to about 200, and most preferably from about 30 to about 150 kpsi.

In certain embodiments the unblocking temperature of blocked isocyanate, blocked polyurethane or blocked polyurea prepolymer cross linking agents used to prepare the crosslinked polyamide composition used to make the golf balls of the present invention typically is greater than 100° C., preferably greater than. 120° C., more preferably greater than 140° C., and most preferably greater than 160° C.

The crosslinked polyamide may be used in the core, intermediate layer(s), and/or cover layer of the golf ball. In certain embodiments, the crosslinked polyamide is the majority ingredient of the material used to form at least one structural component (e.g., the core, intermediate layer(s) or cover layer) of the golf ball. As used herein "majority ingredient" means that the crosslinked polyamide is present in an amount of at least about 50 wt %, particularly at least 60 wt %, and more particularly at least 80 wt %, based on the total weight of all the ingredients in the final material used to form at least one structural component.

Spheres of the crosslinked polyamide composition used to make the golf balls may be made by injection molding for the purposes of evaluating their property performance. The crosslinked polyamide composition used to make the golf balls when formed into such spheres has a PGA compression of from about 30 to about 200, preferably from about 35 to about 185, more preferably from about 45 to about 180; and a COR greater than about 0.500, preferably greater than 0.600, more preferably greater than 0.650, and most preferably greater than 0.700 at 125 ft/sec inbound velocity.

In certain embodiments the intermediate layers of the golf balls have a thickness of from about 0.010 to about 0.400, preferably from about 0.020 to about 0.200 and most preferably from about 0.030 to about 0.100 inches.

In certain embodiments the intermediate layers of the golf ball have a PGA compression as measured on the golf ball precursor of less than or equal to 35, preferably less than or equal to 25, more preferably less than or equal to 15.

In certain embodiments the intermediate layers of the golf ball have a flex modulus of from about 2 to about 25, more preferably of from about 3 to about 20, more preferably of from about 5 to about 15 kpsi.

In certain embodiments the intermediate layers of the golf ball have a Shore D hardness as measured on the ball of greater than or equal to 25, preferably greater than or equal to 30, more preferably greater than or equal to 40 Shore D.

In certain embodiments the inner cover layer of the golf ball has a thickness of from about 0.010 to about 0.400, preferably from about 0.020 to about 0.200 and most preferably from about 0.030 to about 0.100 inches.

In certain embodiments the inner cover layer of the golf ball has a PGA compression as measured on the golf ball precursor of greater than or equal to 60, preferably greater than or equal to 65, more preferably greater than or equal to 70.

In certain embodiments the inner cover layer of the golf ball has a flex modulus of from about 50 to about 80, more preferably of from about 55 to about 75, more preferably of from about 60 to about 70 kpsi.

In certain embodiments the inner cover layer of the golf ball has a Shore D hardness as measured on the ball of greater than or equal to 55, preferably greater than or equal to 60, and most preferably greater than or equal to 65 Shore D units.

In certain embodiments the outer cover layer of the balls may have a thickness of from about 0.015 to about 0.100, preferably from about 0.020 to about 0.080, more preferably from about 0.025 to about 0.060 inches.

In certain embodiments the outer cover layer of the golf ball has a PGA compression of greater than or equal to 60, preferably greater than or equal to 65, more preferably greater than or equal to 70.

In certain embodiments the outer cover layer of the golf ball has a flex modulus of from about 2 to about 30, more preferably of from about 5 to about 25, more preferably of from about 7 to about 20 kpsi.

In certain embodiments the outer cover layer the balls may also have a Shore D hardness as measured on the ball of from about 30 to about 75, preferably from 38 to about 68 and most preferably from about 40 to about 65.

In certain embodiments the core of the golf balls have a diameter of from about 0.50 to about 1.62, preferably of from about 0.70 to about 1.40, more preferably greater than about 0.80 to about 1.30 inches in diameter.

In certain embodiments the core of the balls have a PGA compression of less than or equal to 30, preferably less than or equal to 20, and most preferably less than or equal to 10.

In certain embodiments the core of the golf balls have a flex modulus of less than or equal to 15, preferably less than or equal to 10, more preferably less than or equal to 5 kpsi.

In certain embodiments the core of the golf balls has a Shore D hardness at the outer surface of less than or equal to 60, preferably less than or equal to 50, more preferably less than or equal to 45 Shore D.

The various core layers (including the center) if present may each exhibit a different hardness. The difference between the center hardness and that of the next adjacent layer, as well as the difference in hardness between the various core layers may be greater than 2, preferably greater than 5, most preferably greater than 10 units of Shore D.

In one preferred aspect, the hardness of the center and each sequential layer increases progressively outwards from the center to outer core layer.

In another preferred aspect, the hardness of the center and each sequential layer decreases progressively inwards from the outer core layer to the center.

The COR of the golf balls may be greater than or equal to 0.700, preferably greater than or equal to 0.730, more preferably greater than or equal to 0.750, most preferably greater than or equal to 0.775, and especially greater than or equal to 0.800 at 125 ft/sec inbound velocity.

The shear cut resistance of the golf balls may be less than or equal to 4, preferably less than or equal to 3, even more preferably less than or equal to 2.

EXAMPLES

The various test properties which may be used to measure the properties of the golf balls are described below including any test methods as defined below.

Core or ball diameter may be determined by using standard linear calipers or size gauge.

Compression may be measured by applying a spring-loaded force to the golf ball center, golf ball core, or the golf ball to be examined, with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch (5 mm) against this spring. If the spring, in turn, compresses 0.2 inch, the compression is rated at 100; if the spring compresses 0.1 inch, the compression value is rated as 0. Thus more compressible, softer materials will have lower Atti gauge values than harder, less compressible materials. Compression measured with this instrument is also referred to as PGA compression. The approximate relationship that exists between Atti or PGA compression and Riehle compression can be expressed as:

(Atti or PGA compression)=(160-Riehle Compression).

Thus, a Riehle compression of 100 would be the same as an Atti compression of 60.

When a compression value is described herein for a core it is the compression as measured directly on the core itself. When a compression value is described herein for a golf ball or an outer cover layer, it is the compression as measured directly on the outer cover layer as constituted on the finished golf ball which is equivalent to a measurement on the golf ball itself. However when a compression value is quoted for an inner mantle layer, it is obtained by direct measurement on the inner mantle layer as it surrounds the golf ball construction up to the point of adding that layer i.e. the measurement is made directly on the inner mantle layer molded on the golf ball core. Similarly when a compression value is quoted for an intermediate mantle layer it is obtained by direct measurement on the intermediate mantle layer as it surrounds the golf ball construction up to that point i.e. the measurement is made on the golf ball precursor which is the core on which is molded the inner mantle layer and on which is molded the intermediate mantle layer. When a compression value is quoted for an outer mantle layer, it is obtained by direct measurement on the outer mantle layer as it surrounds the golf ball construction up to that point i.e. the measurement is made on the golf ball precursor constituted by the core on which is molded the inner mantle layer on which is molded the intermediate mantle layer on which is molded the outer mantle layer. Finally when a compression value is quoted for an inner cover layer, it is obtained by direct measurement on the inner cover layer as it surrounds the golf ball construction up to that point i.e. the measurement is made on the golf ball precursor constituted by the core on which is molded the inner mantle layer on which is molded the intermediate mantle layer on which is molded the outer mantle layer and on which is molded the inner cover layer. To further clarify this measurement as being on the golf ball precursor, this measurement is called out as being on the golf ball precursor as in for example "an inner mantle layer . . . having a PGA compression as measured on the golf ball precursor of . . . ".

COR may be measured using a golf ball or golf ball sub-assembly, air cannon, and a stationary steel plate. The steel plate provides an impact surface weighing about 100 pounds or about 45 kilograms. A pair of ballistic light screens, which measure ball velocity, are spaced apart and located between the air cannon and the steel plate. The ball is fired from the air cannon toward the steel plate over a range of test velocities from 50 ft/s to 180 ft/sec (for the tests used herein the velocity was 125 ft/sec). As the ball travels toward the steel plate, it activates each light screen so that the time at each light screen is measured. This provides an incoming time period proportional to the ball's incoming velocity. The ball impacts the steel plate and rebounds though the light screens, which again measure the time period required to transit between the light screens. This provides an outgoing transit time period proportional to the ball's outgoing velocity. The coefficient of restitution can be calculated by the ratio of the outgoing transit time period to the incoming transit time period, $COR=T_{out}/T_{in}$.

A "Mooney" viscosity is a unit used to measure the plasticity of raw or unvulcanized rubber. The plasticity in a Mooney unit is equal to the torque, measured on an arbitrary scale, on a disk in a vessel that contains rubber at a temperature of 100° C. and rotates at two revolutions per minute. The measurement of Mooney viscosity is defined according to ASTM D-1646.

Shore D hardness may be measured in accordance with ASTM Test D2240.

Melt flow index (MFI, I2) may be measured in accordance with ASTM D-1238, Condition 230° C./2.16 kg.

Tensile Strength and Tensile Elongation were measured with ASTM D-638.

Flexural modulus and flexural strength were measured using ASTM standard D-790.

Shear cut resistance may be determined by examining the balls after they were impacted by a pitching wedge at controlled speed, classifying each numerically from 1 (excellent) to 5 (poor), and averaging the results for a given ball type. Three samples of each Example may be used for this testing. Each ball is hit twice, to collect two impact data points per ball. Then, each ball is assigned two numerical scores-one for each impact-from 1 (no visible damage) to 5 (substantial material displaced). These scores may be then averaged for each Example to produce the shear resistance numbers. These numbers may be then directly compared with the corresponding number for a commercially available ball, having a similar construction including the same core and mantle composition and cover thickness for comparison purposes.

Impact durability may be tested with an endurance test machine. The endurance test machine is designed to impart repetitive deformation to a golf ball similar to a driver impact. The test machine consists of an arm and impact plate or club face that both rotate to a speed that generates ball speeds of approximately 155-160 mph. Ball speed is measured with two light sensors located 15.5" from impact location and are 11" apart. The ball is stopped by a net and if a test sample is not cracked will continue to cycle through the machine for additional impacts. For golf balls, if zero failures occur through in excess of 100 impacts per ball than minimal field failures will occur. For layers adjacent to the outer cover, fewer impacts are required since the cover typically "protects" the inner components of the golf ball.

Robot Testing

The ball performance was determined using a Robot Test, which utilized a commercial swing robot in conjunction with an optical camera system to measure ball speed, launch angle, and backspin. In this test, the required golf club was attached to a swing robot, and the swing speed and power profile, as well as the tee location and club lie angle, were set-up to generate the test values.

What is claimed is:

1. A golf ball comprising;
    1) a core comprising a center,
    2) an outer cover layer; and
    3) one or more intermediate layers,
wherein at least one or more of the core, outer cover layer or one or more intermediate layer comprises a crosslinked polyamide composition comprising the reaction product of;
    (A) of from about 70 to about 99.5 wt % (based on the combined weight of Components A and B) of one or more polyamides; and
    (B) of from about 0.5 to about 30 wt % (based on the combined weight of Components A and B) of one or more crosslinking agents; and
wherein said crosslinked polyamide composition has a flexural modulus of from about 5 to about 500 kpsi, and a material Shore D hardness of from about 25 to about 85.

2. The golf ball of claim 1 wherein at least one or more of the core, outer cover layer or one or more intermediate layers comprises a crosslinked polyamide composition, comprising the reaction product of;
    (A) of from about 75 to about 99 wt % (based on the combined weight of Components A and B) of one or more polyamides; and
    (B) of from about 1 to about 25 wt % (based on the combined weight of Components A and B) of one or more crosslinking agents selected from the group consisting of a peroxide, a polyisocyanate, a blocked polyisocyanate, a diisocyanate, a blocked diisocyanate, a polyurethane prepolymer, a blocked polyurethane prepolymer, a polyurea prepolymer, a blocked polyurea prepolymer, a polyamine, a blocked polyamine, a diamine, a blocked diamine; a dicyanodiamide, a glycidyl group-containing polymer, and any and all combinations or mixtures thereof; and
wherein said crosslinked polyamide composition has a flexural modulus of from about 15 to about 400 kpsi, and a material Shore D hardness of from about 30 to about 80.

3. The golf ball of claim 1 wherein at least one or more of the core, outer cover layer or one or more intermediate layers comprises a crosslinked polyamide composition, comprising the reaction product of;
    (A) of from about 80 to about 98 wt % (based on the combined weight of Components A and B) of one or more polyamides; and
    (B) of from about 2 to about 20 wt % (based on the combined weight 5 of Components A and B) of one or more crosslinking agents selected from the group consisting of a peroxide, a polyisocyanate, a blocked polyisocyanate, a diisocyanate, a blocked diisocyanate, a polyurethane prepolymer, a blocked polyurethane prepolymer, a polyurea prepolymer, a blocked polyurea prepolymer, a polyamine, a blocked polyamine, a diamines, a blocked diamine; a dicyanodiamide, a glycidyl group-containing polymer, and any and all combinations or mixtures thereof; and
wherein said crosslinked polyamide composition has a flexural modulus of from about 20 to about 300 kpsi, and a material Shore D hardness of from about 35 to about 75.

4. The golf ball of claim 3 wherein said core comprises the crosslinked polyamide composition and said outer cover layer comprises a polymer selected from the group consisting thermoset polyurethane, thermoset polyurea, thermoplastic polyurethane, thermoplastic polyurea, ionomer, styrenic block copolymer, ethylene/(meth)acrylic acid copolymer, or ethylene/(meth)acrylic acid/alkyl (meth)acrylate terpolymer, a unimodal ionomer, a bimodal ionomer, a modified unimodal ionomer, a modified bimodal ionomer, polyalkenamer, polyamide, trans-polyisoprene, partially hydrogenated polybutadiene, and any and all combinations or mixtures thereof.

5. The golf ball of claim 3 wherein said one or more intermediate layers comprises the crosslinked polyamide composition and said outer cover layer comprises a polymer selected from the group consisting of thermoset polyurethane, thermoset polyurea, thermoplastic polyurethane, thermoplastic polyurea, ionomer, styrenic block copolymer, ethylene/(meth)acrylic acid copolymer, or ethylene/(meth) acrylic acid/alkyl (meth)acrylate terpolymer, a unimodal ionomer, a bimodal ionomer, a modified unimodal ionomer, a modified bimodal ionomer, polyalkenamer, polyamide, trans-polyisoprene, partially hydrogenated polybutadiene, and any and all combinations or mixtures thereof.

6. The golf ball of claim 3 wherein said outer cover layer comprises the crosslinked polyamide composition.

7. The golf ball of claim 3, wherein said outer cover layer comprises a blend composition comprising one or more ionomers blended with;
    A) one or more triblock copolymers; or
    B) one or more hydrogenation products of the triblock copolymers; or
    C) one or more hydrogenated diene block copolymers; and
    wherein each triblock copolymer has
        (1) a first polymer block comprising an aromatic vinyl compound,
        (2) a second polymer block comprising a conjugated diene compound, and wherein each hydrogenated diene block copolymer has a polystyrene-reduced number average molecular weight of from 50,000 to 600,000, and is a hydrogenation product of;
            (i) an A-B block copolymer, in which A is an alkenyl aromatic compound polymer block, and B is either
                (a) a conjugated diene homopolymer block, wherein the vinyl content of the conjugated diene portion is more than 60%, or
                (b) an alkenyl aromatic compound-conjugated diene random copolymer block wherein the vinyl content of the conjugated diene portion is 15-60%, or
                (c) an A-B-C block copolymer, in which A and B are as defined above and C is an alkenyl aromatic compound-conjugated diene copolymer tapered block, wherein the proportion of the alkenyl aromatic compound increases gradually, or
                (d) an A-B-A block copolymer, in which A and B are as defined above; and
    wherein in each of the hydrogenated diene block copolymers, the weight proportion of the alkenyl aromatic compound to conjugated diene is from 5/95 to 60/40, the content of the bound alkenyl aromatic compound in at least one block A is at least 3% by weight, the total of the bound alkenyl aromatic compound contents in the two block A's or the block A and the block C is 5% to 25% by weight based on the total monomers, and at least 80% of the double bond unsaturations of the conjugated diene portion is saturated by the hydrogenation.

8. The golf ball of claim 3, wherein the outer cover layer comprises the reaction product of:
  A) at least one component A comprising a monomer, oligomer, or prepolymer, or polymer comprising at least 5% by weight of at least one type of functional group;
  B) at least one component B comprising a monomer, oligomer, prepolymer, or polymer comprising less by weight of anionic functional groups than the weight percentage of anionic functional groups of the at least one component A; and
  C) at least one component C comprising a metal cation; and wherein the reaction product comprises a pseudo-crosslinked network of the at least one component A in the presence of the at least one component B.

9. The golf ball of claim 3, wherein one or more of said intermediate layers comprises a polyalkenamer rubber selected from the group consisting of polybutenamer rubber, polypentenamer rubber, polyhexenamer rubber, polyheptenamer rubber, polyoctenamer rubber, polynonenamer rubber, polydecenamer rubber polyundecenamer rubber, polydodecenamer rubber, polytridecenamer rubber and any and all combinations thereof.

10. The golf ball of claim 1, wherein the crosslinked polyamide is present in an amount of at least about 50 wt% of the core, intermediate layer and/or cover layer, based on the total weight of all the ingredients in the final material used to form the core, intermediate layer and/or cover layer.

* * * * *